US006327044B1

(12) United States Patent
Shima

(10) Patent No.: US 6,327,044 B1
(45) Date of Patent: *Dec. 4, 2001

(54) PRINTER FOR PRINTING A PLURALITY OF PRINT DATA PIECES IN A PREDETERMINED ORDER

(75) Inventor: Toshihiro Shima, Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/880,833

(22) Filed: Jun. 23, 1997

(30) Foreign Application Priority Data

Jun. 21, 1996 (JP) .................................................. 9-161281
Mar. 12, 1997 (JP) .................................................. 9-057873

(51) Int. Cl.[7] .................................................. G06K 15/00
(52) U.S. Cl. .................. 358/1.15; 358/1.16; 358/1.13
(58) Field of Search ..................................... 395/112, 114, 395/115, 116, 827, 860, 874, 707, 293, 296, 299, 728, 729, 730, 732; 364/468.06, 468.07; 358/1.13, 1.15, 1.16, 1.17, 1.1, 1.14, 404, 444, 468; 710/14, 44, 40, 54, 115, 116, 121–123, 244, 264

(56) References Cited

U.S. PATENT DOCUMENTS

| 4,262,331 | * | 4/1981 | Freeland et al. ..................... 710/124 |
| 4,293,233 | * | 10/1981 | Hoffman ........................... 400/144.2 |
| 4,941,108 | * | 7/1990 | Aoyagi et al. ....................... 358/1.13 |
| 4,949,301 | * | 8/1990 | Joshi et al. ............................ 711/100 |
| 5,299,296 | * | 3/1994 | Padalino et al. ...................... 395/112 |
| 5,327,526 | * | 7/1994 | Nomura et al. ...................... 358/1.16 |
| 5,333,246 | * | 7/1994 | Nagasaka ............................. 345/433 |
| 5,358,238 | * | 10/1994 | Mandel et al. ....................... 271/298 |
| 5,402,350 | * | 3/1995 | Kline ............................... 364/468.07 |
| 5,442,730 | * | 8/1995 | Bigus ..................................... 706/19 |
| 5,444,827 | * | 8/1995 | Briggs et al. ........................ 358/1.16 |
| 5,561,456 | * | 10/1996 | Yu ............................................ 348/7 |
| 5,630,030 | * | 5/1997 | Kawamura ........................... 358/1.16 |
| 5,630,032 | * | 5/1997 | Yamaguchi et al. ................. 395/115 |
| 5,778,162 | * | 7/1998 | Morisaki .............................. 358/1.14 |
| 5,781,596 | * | 7/1998 | Shields ................................. 375/371 |
| 5,791,790 | * | 8/1998 | Bender et al. .......................... 400/61 |
| 5,873,659 | * | 2/1999 | Edwards et al. ....................... 400/61 |

FOREIGN PATENT DOCUMENTS

| 653 700 A1 | 5/1995 | (EP) . |
| 6-122255 | 5/1994 | (JP) . |
| 7-129338 | 5/1995 | (JP) . |

* cited by examiner

*Primary Examiner*—Dov Popovici
(74) *Attorney, Agent, or Firm*—Sughrue, Mion, Zinn, Macpeak & Seas, PLLC

(57) ABSTRACT

A printer includes a print data reception section for receiving print data corresponding to a plurality of print jobs, an intermediate data generation section for generating intermediate code from the received print data, a print request preparation section for issuing a print request for generated intermediate code, and a print mechanism for printing based on the corresponding intermediate code in the acceptance order of the print requests. The printer is provided with a priority determination section for determining priorities for issuing the print requests so that print requests are issued in the print data transfer termination order.

20 Claims, 23 Drawing Sheets

(PRINT DATA RECEPTION TASK 1)

(INTERMEDIATE CODE GENERATION TASK 1)

| PRINT JOB NO. | 1 | 2 | 3 |
|---|---|---|---|
| m | 2 | 1 | 3 |

PRINT MECHANISM ACQUISITION REQUEST SUBROUTINE

PRINTER FOR PRINTING A PLURALITY OF PRINT DATA PIECES IN A PREDETERMINED ORDER

BACKGROUND OF THE INVENTION

1. Field of the Invention

This invention relates to a printer for printing a plurality of print data pieces in a predetermined order.

2. Description of the Related Art

Conventional printers normally are used by local connection to data processing systems in a one-to-one correspondence with each other. Thus, generally printers comprise only a single type of connection interface adaptive to the data processing system to be connected to the printer.

However, with change in an information processing environment in recent years, it has been demanded that a printer can cover data processing systems having different types of interfaces. For example, a printer comprising a number of input interfaces such as serial ports and parallel ports, which will be hereinafter called input ports, is provided in response to such a demand.

FIG. 27 shows an example of such a printer having a number of input ports. In the figure, for example, a printer 30 is connected to four data processing systems, hereinafter called hosts, H (H1–H4) via input ports P (P1–P4), and each input port P (P1–P4) is provided with a buffer memory B (B1–B4) having a predetermined capacity.

In the configuration, assume that print commands and data, which will be hereinafter called print jobs, are input to the input ports P from the hosts H at timings as shown in FIG. 28 and are stored in the buffer memories B. At this time, the printer 30 first prints based on the print job input from the host H1 and subsequently prints based on the print jobs input from the hosts H3, H2, and H4 in order. The reason why the conventional printer 30 prints in the above order is that, as shown in FIG. 28, an image formation process is executed in the printer data transfer start order to the input ports P, so that a print request is issued to a print mechanism (not shown), and that at the termination of the print job, an image formation process based on the next received print job is executed.

Thus, the conventional printer 30 starts printing in the print job reception order and does not start printing based on another print job unless the current print job is complete. Therefore, the printer involves the following problem:

In the example shown in FIG. 28, the print jobs sent from the hosts H2–H4 enter a printable state earlier than the print job input from the host H1, but enter a wait state until completion of the print job input from the host H1 because they are late for the print data transfer start time. Thus, an appreciable wait time is contained by the time all print jobs are completed, not only prolonging the total print time in the printer 30, but also making the operator of the host in the wait state irritated.

SUMMARY OF THE INVENTION

It is therefore an object of the invention to provide a printer that can solve the problems and execute a plurality of print jobs in the optimum order.

According to a first aspect of the invention, there is provided a printer comprising: means for receiving print data corresponding to a plurality of print jobs; means for generating intermediate code from the print data received by the reception means; print request preparation means for issuing a print request for the generated intermediate code; a print mechanism for printing based on the corresponding intermediate code in an acceptance order of the print requests issued by the print request preparation means; and priority determination means for determining a print job execution priority used as a trigger for issuing the print request.

According to a second aspect of the invention, there is provided a printer comprising: means for receiving print data corresponding to a plurality of print jobs; means for storing a plurality of print data received by the reception means; means for generating intermediate code from each of the print data; means for storing intermediate code generated for each print data; print request preparation means for issuing a print request for the generated intermediate code; a print mechanism for printing based on the corresponding intermediate code in an acceptance order of the print requests issued by the print request preparation means; and priority determination means for determining a print job execution priority used as a trigger for issuing the print request; wherein the priority determination means can select either of first and second priority modes, the first priority mode assigning high execution priorities to print jobs in a storage completion time order of the print data in the print data storage means so that the print requests are issued according to the execution priorities, and the second priority mode assigning high execution priorities to print jobs in a storage completion time order of the intermediate code in the intermediate code storage means so that the print requests are issued according to the execution priorities.

BRIEF DESCRIPTION OF THE DRAWINGS

In the accompanying drawings:

FIG. 16(A) is a flowchart and FIG. 16(B) is an illustration to show an example of the structure of a priority determination storage section;

DETAILED DESCRIPTION OF THE PREFERRED EMBODIMENTS

Referring now to the accompanying drawings, there are shown preferred embodiments of the invention.

1st Embodiment

Figure 1:
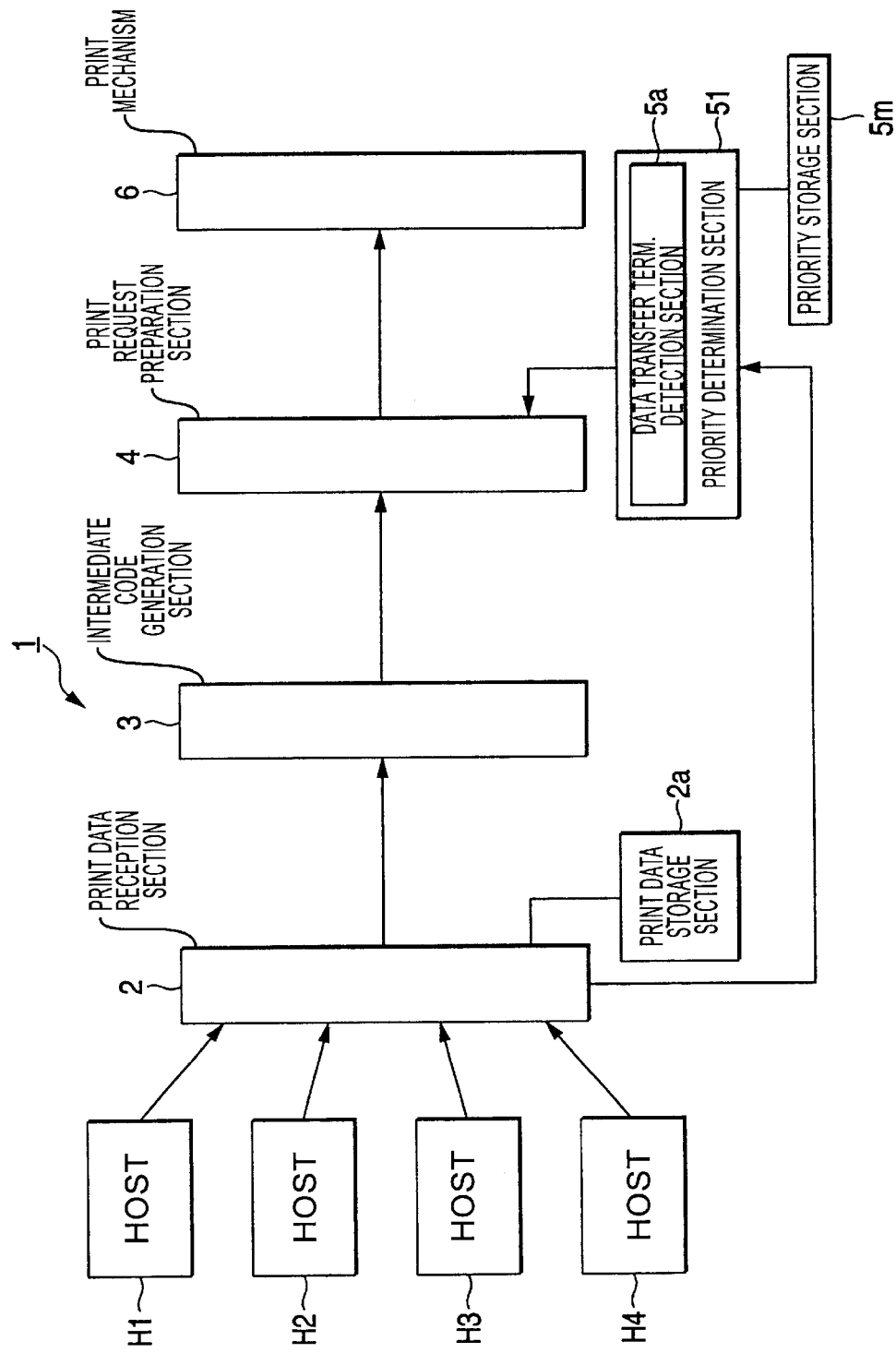
FIG. 1 is a functional block diagram of a printer according to a first embodiment of the invention.

FIG. 1 is a functional block diagram of a printer according to a first embodiment of the invention. As shown here, the printer 1 according to the first embodiment comprises a print data reception section 2, a print data storage section 2a functioning like the above-described buffer memories B, an intermediate code generation section 3, a print request preparation section 4, a priority determination section 51, and a print mechanism 6. The priority determination section 51 comprises a data transfer termination detection section 5a for detecting the transfer termination time of print data of each print job and setting order information in the print jobs in the transfer termination detection order and a priority storage section 5m for storing the transfer termination detection order detected by the data transfer termination detection section 5a. The print data transfer termination time can be detected, for example, by detecting a given blank time at the storage time or specific data such as a transfer end command contained in the print job or by prediction based on the print data size, the processing speed measurement value, etc.

The print data reception section 2, the intermediate code generation section 3, the print request preparation section 4, and the priority determination section 51 are formed in a controller comprising a microprocessor (central processing unit (CPU)) that can perform concurrent processing in a timesharing manner and are given a required function or are controlled by the CPU. The intermediate code generation section 3 is followed by real image data generation section (not shown) for generating a bit image (real image data) of a real image.

The print data reception section 2 receives print jobs (containing print data) sent from hosts H (H1–H4) and has four input ports provided in a one-to-one correspondence with the interfaces of the hosts H. Areas for storing print jobs for each input port are formed in the print data storage section 2a. The print data storage areas are formed in a one-to-one correspondence with the input ports for convenience of the subsequent processing; this manner need not always be adopted and a specific storage area of the print data storage section 2a may be shared among the input ports.

When a predetermined image formation process is executed according to a print job, the intermediate code generation section 3 once converts print data of the print job into intermediate code. The intermediate code is made up of position information for each print data piece and image information at the position (bit map data for characters, form data for graphics, or image data for photos, etc.,). The reason why print data is converted into intermediate data is that if real image data is generated directly from print data, the image formation process becomes complicated and takes time and that normally the intermediate code size is smaller than the real image data size at the storage time. The generated intermediate code is developed or compressed into the real image data whenever necessary by the real image data generation means and is stored until an instruction is given from the print mechanism 6.

The print request preparation section 4 prepares a print request for the intermediate code generated by the intermediate code generation section 3 and issues the print request to the print mechanism 6 according to order information from the priority determination section 51.

The print mechanism 6, which has an engine (not shown), gets real image data corresponding to the intermediate code in the acceptance order of the print requests issued by the print request preparation section 4 and executes printing on paper.

Figure 2:
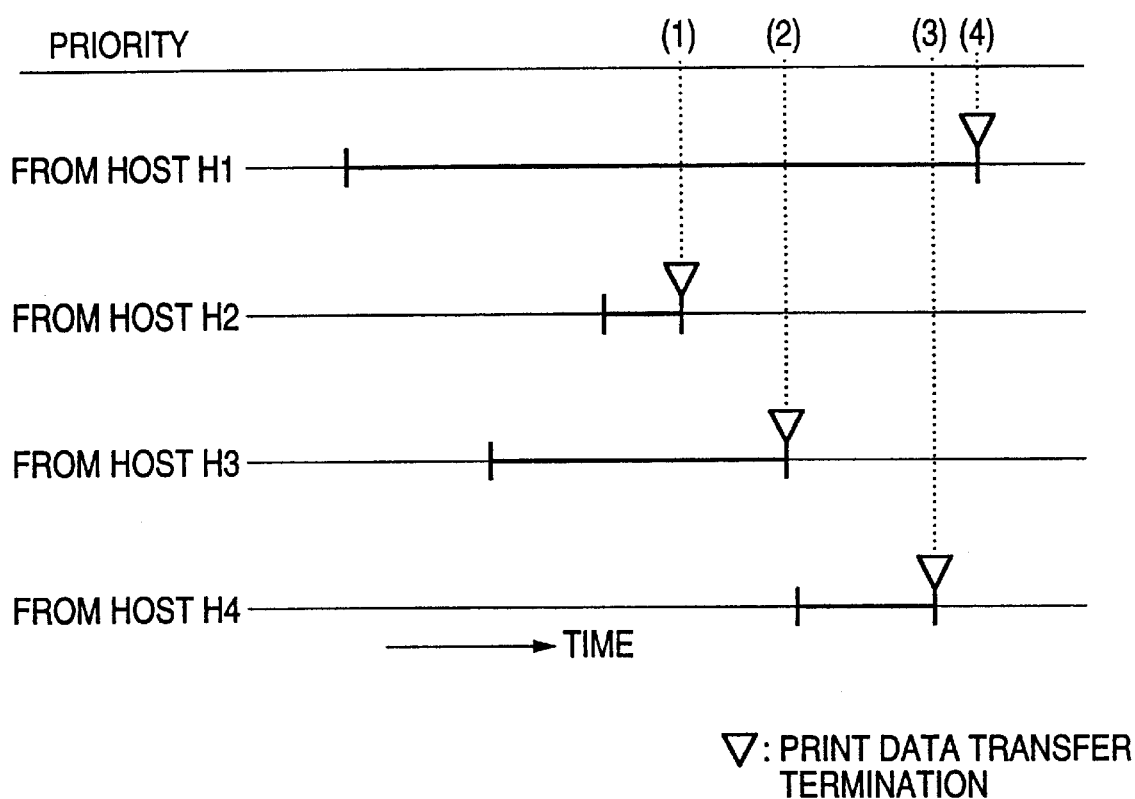
FIG. 2 is a timing chart to explain the print job processing order in the first embodiment of the invention.
Figure 3:
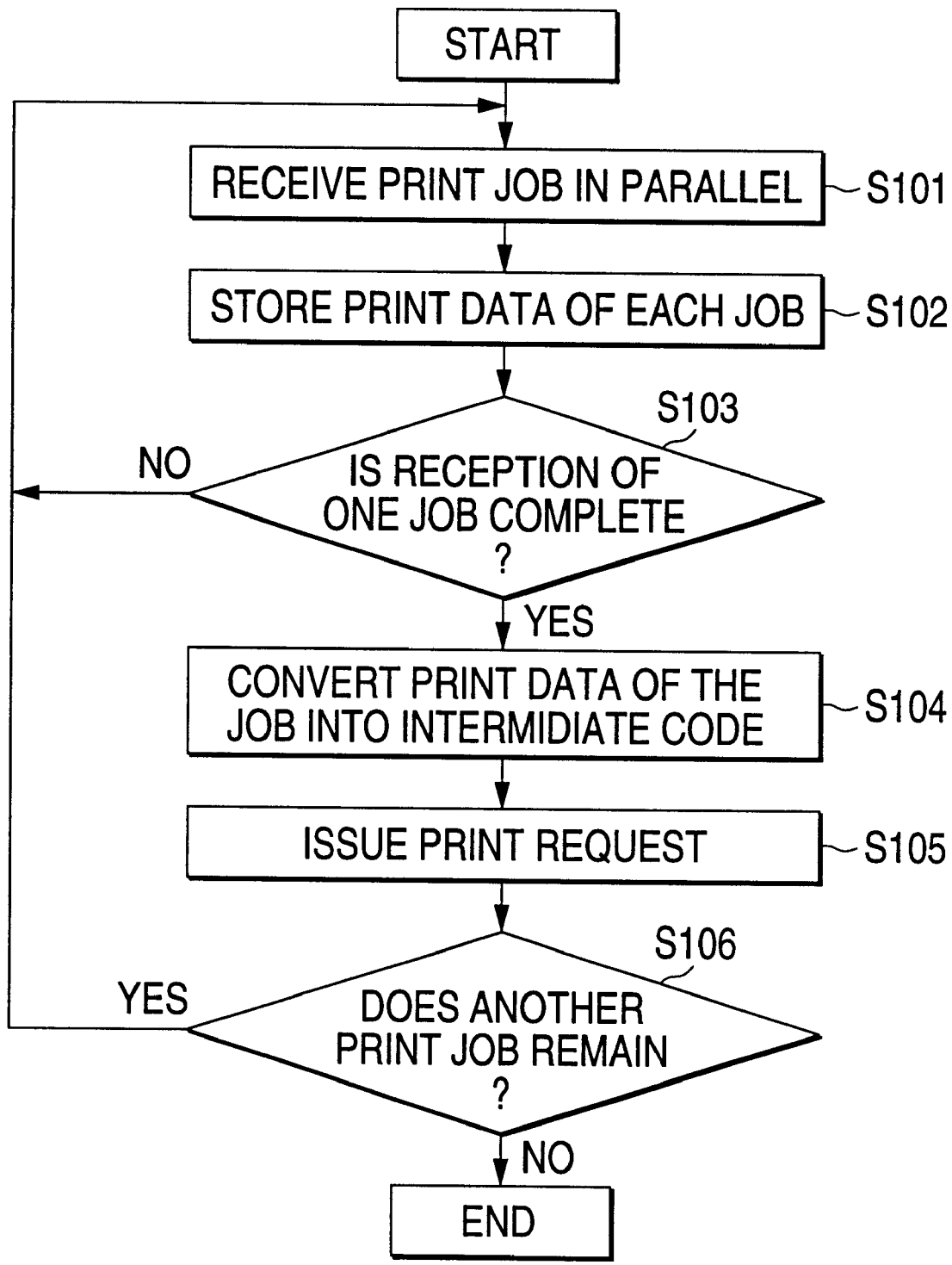
FIG. 3 is a flowchart to show a print procedure according to the first embodiment of the invention.
Figure 28:
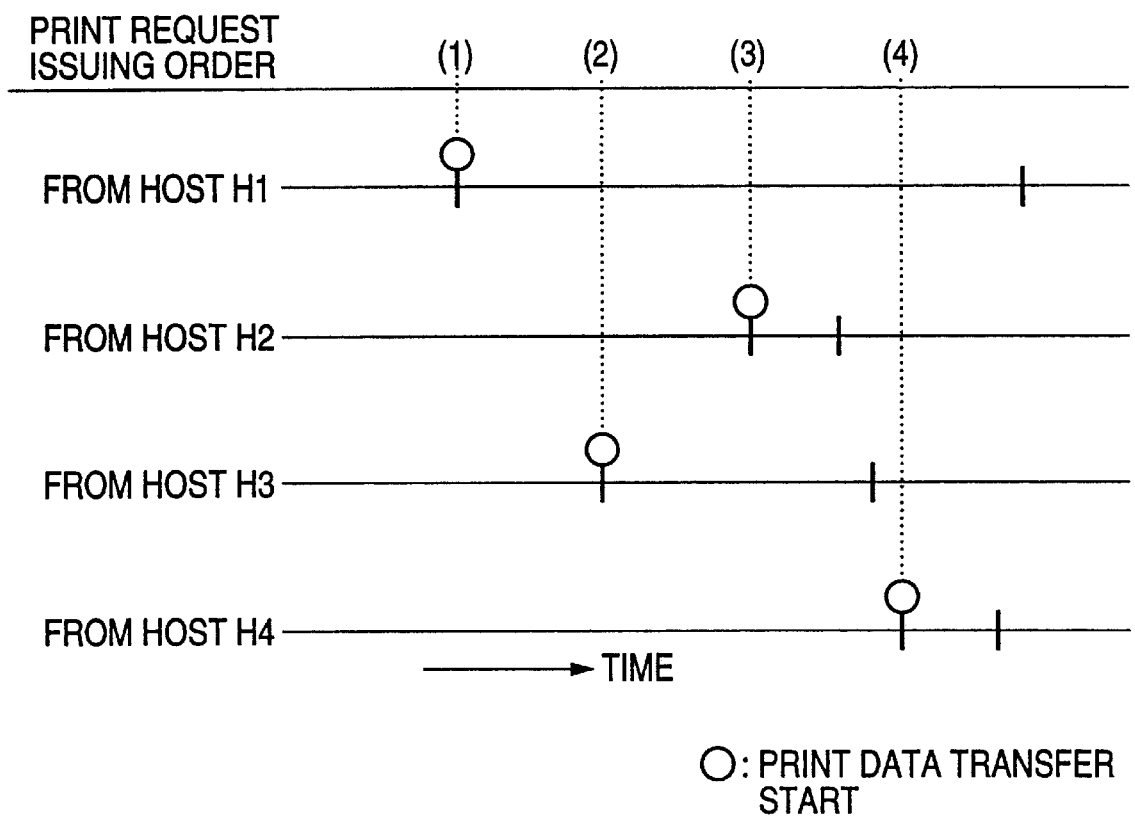
FIG. 28 is a timing chart to explain the print job processing order in the conventional printer in FIG. 27.

Next, an operation example of the printer 1 in the embodiment will be discussed with reference to FIGS. 2 and 3. FIG. 2 is a timing chart to explain print request issuing priorities (print job execution priorities). Here, for convenience, the print data transfer timings from the hosts H1–H4 are made the same as those in the example in FIG. 28. FIG. 3 is a flowchart to show a print procedure according to the embodiment.

Print jobs (containing print data) from the hosts H1–H4 are transferred to the corresponding input ports of the print data reception section 2. As shown in FIG. 3, the print data reception section 2 receives the transferred print jobs in parallel at step S101 and stores the print data in the print data storage section 2a in order at step S102. When reception of one job is complete, namely, when transfer of print data is complete at step S103, the intermediate code generation section 3 converts the print data of the job into intermediate code at step S104. At this time, the priority determination section 51 detects a job whose print data has been transferred by the data transfer termination detection section 5a, determines the print request issuing order of the job, stores the order in the priority storage section 5m, and sends the order to the print request preparation section 4, which then issues a print request according to the order at step S105. This process is repeated in order for other print jobs whose print data has been transferred. When no print data remains at step S106, the processing is terminated.

Thus, in the embodiment, a print request is issued in the print data transfer termination order of the print jobs and printing on paper is executed. In the example in FIG. 2, the transfer start time of the print data from the host H1 to the print data storage section 2a is the earliest, but the transfer completion of the print data is the latest because the print data has a large size or the data transfer speed of the print data is slow. Therefore, the print job is assigned priority (4). In contrast, the transfer start time of the print data from the host H2 is the third, but the transfer completion of the print data is the earliest. Therefore, the print job is assigned priority (1), the highest priority. Likewise, the print job from the host H3 is assigned priority (2) and the print job from the host H4 is assigned priority (3). Then, the print request preparation section 4 issues print requests in the order of the print jobs from the hosts H2, H3, H4, and H1, and the print mechanism 6 executes printing.

Thus, in the embodiment, intermediate code generation of the print data of the print job whose print data has been transferred, such as the print job from the host H2, and printing based on the print job are executed earlier, and the print jobs and print data from other hosts H1, H3, and H4 are stored in the print data storage section 2a and intermediate code generation and printing are executed later. Upon completion of the preceding printing, printing based on the next print job is executed successively. Therefore, the use efficiency of the engine in the print mechanism 6 is raised and sharing the printer 1 matching user's feeling of reality is enabled.

2nd Embodiment

Figure 4:
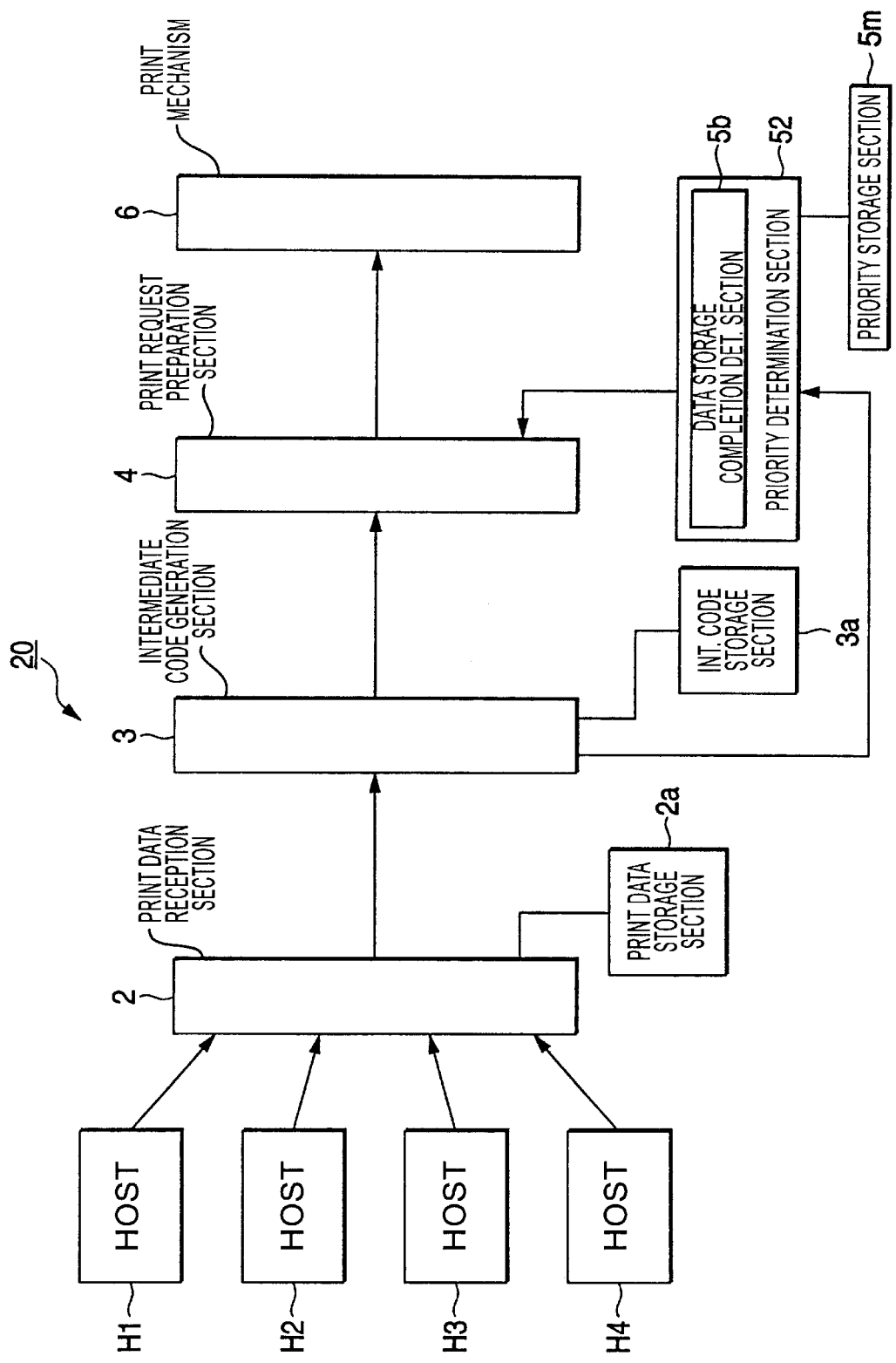
FIG. 4 is a functional block diagram of a printer according to a second embodiment of the invention.

FIG. 4 is a functional block diagram of a printer 20 according to a second embodiment of the invention. Parts identical with those of the printer 1 of the first embodiment previously described with reference to FIG. 1 are denoted by the same reference numerals in FIG. 4. The printer 20 in the second embodiment has an intermediate code storage section 3a comprising RAM, etc., added to the intermediate code generation section 3 in FIG. 1 for storing intermediate code generated based on print data. It is provided with a data storage completion detection section 5b for detecting the storage completion time of the intermediate code storage section 3a and a priority storage section 5m for storing the storage completion time detected by the data storage completion detection section 5b, the sections 5b and 5m making up a priority determination section 52.

The data storage completion time can be detected, for example, by detecting a given processing blank time while the intermediate code generation section 3 generates and stores intermediate code or by predicting the storage completion time of intermediate code from the intermediate code generation speed and the data size of the intermediate code and the time required for storing the intermediate code after generation of the intermediate code, etc. The intermediate code storage completion time needs to be predicted also considering the fact that the time required for generating the intermediate code varies depending on complexity of print data and the fact that previous development for developing into real image data rather than intermediate code and compressing is performed as required.

In the embodiment, the priority determination section 52 assigns high execution priorities to print jobs in the completion time order of storing real image data in the intermediate code storage section 3a and stores the print job execution priorities in the priority storage section 5m, so that a print request preparation section 4 issues print requests in the execution priority order, provided that a print data storage section 2a and the intermediate code storage section 3a can have a sufficient memory capacity.

Figure 5:
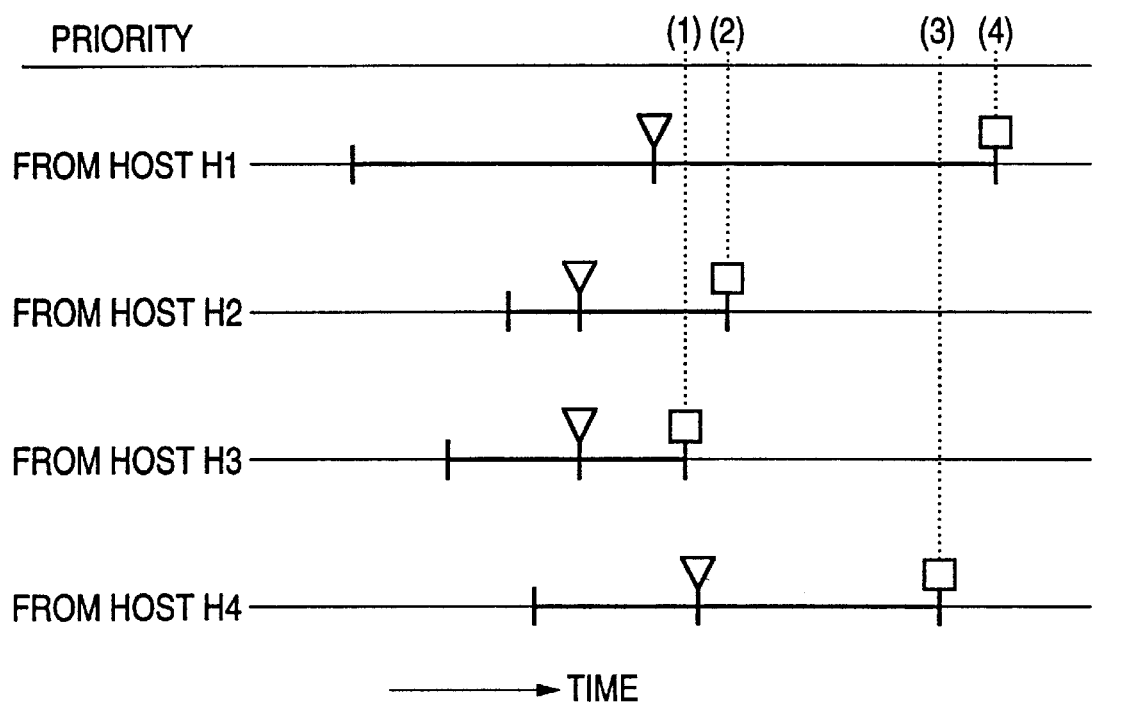
FIG. 5 is a timing chart to explain the print job processing order in the second embodiment of the invention.
Figure 6:
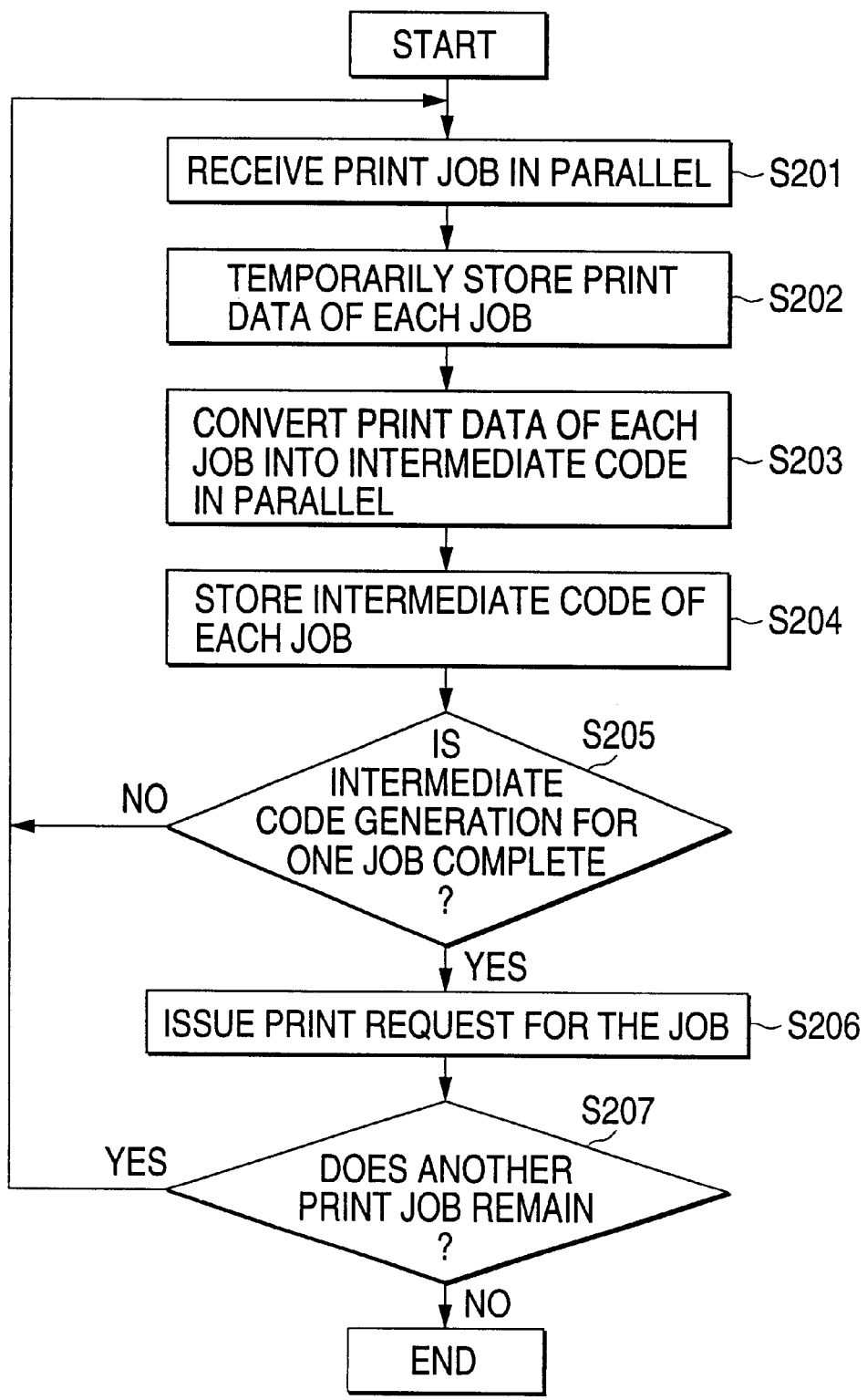
FIG. 6 is a flowchart to show a print procedure according to the second embodiment of the invention.

FIG. 5 is a timing chart to explain print request issuing priorities (print job execution priorities). FIG. 6 is a flowchart to show a print procedure according to the embodiment.

In FIG. 6, print jobs (containing print data) from hosts H1–H4 are received in parallel and the print data is stored in the print data storage section 2a at steps S201 and S202, as in the first embodiment. However, the print data is temporarily stored in the print data storage section 2a for intermediate code generation at the following stage.

In the embodiment, as shown in FIG. 6, intermediate code of print data based on each job is generated in parallel at step S203 and the generated intermediate code is stored in the corresponding area of the intermediate code storage section 3a at step S204. When intermediate code generation for one job terminates, namely, when intermediate code storage is complete at step S205, the priority determination section 52 determines the print request issuing order and sends the order to the print request preparation section 4, which then issues a print request according to the order at step S206. This process is repeated in order for other print jobs whose intermediate code has been stored. When no print data remains at step S207, the processing is terminated.

According to the procedure, print requests are issued in the storage completion order of intermediate code in the intermediate code storage section 3a regardless of the transfer start or termination time of print data, and printing on paper is executed. In the example in FIG. 5, intermediate code storage is complete the earliest for the print job from the host H3. Therefore, the print job is assigned the highest priority (1). Likewise, the print jobs from the hosts H2, H4, and H1 are assigned priorities (2), (3), and (4) respectively. Then, the print request preparation section 4 issues print requests in the order of the print jobs from the hosts H3, H2, H4, and H1, and a print mechanism 6 executes printing.

Thus, if the print data storage section 2a and the intermediate code storage section 3a can have a sufficient memory capacity, the use efficiency of the engine in the print mechanism 6 can be enhanced as compared with the first embodiment and the printer 20 more matching user's feeling of reality can be configured.

3rd Embodiment

Figure 7:
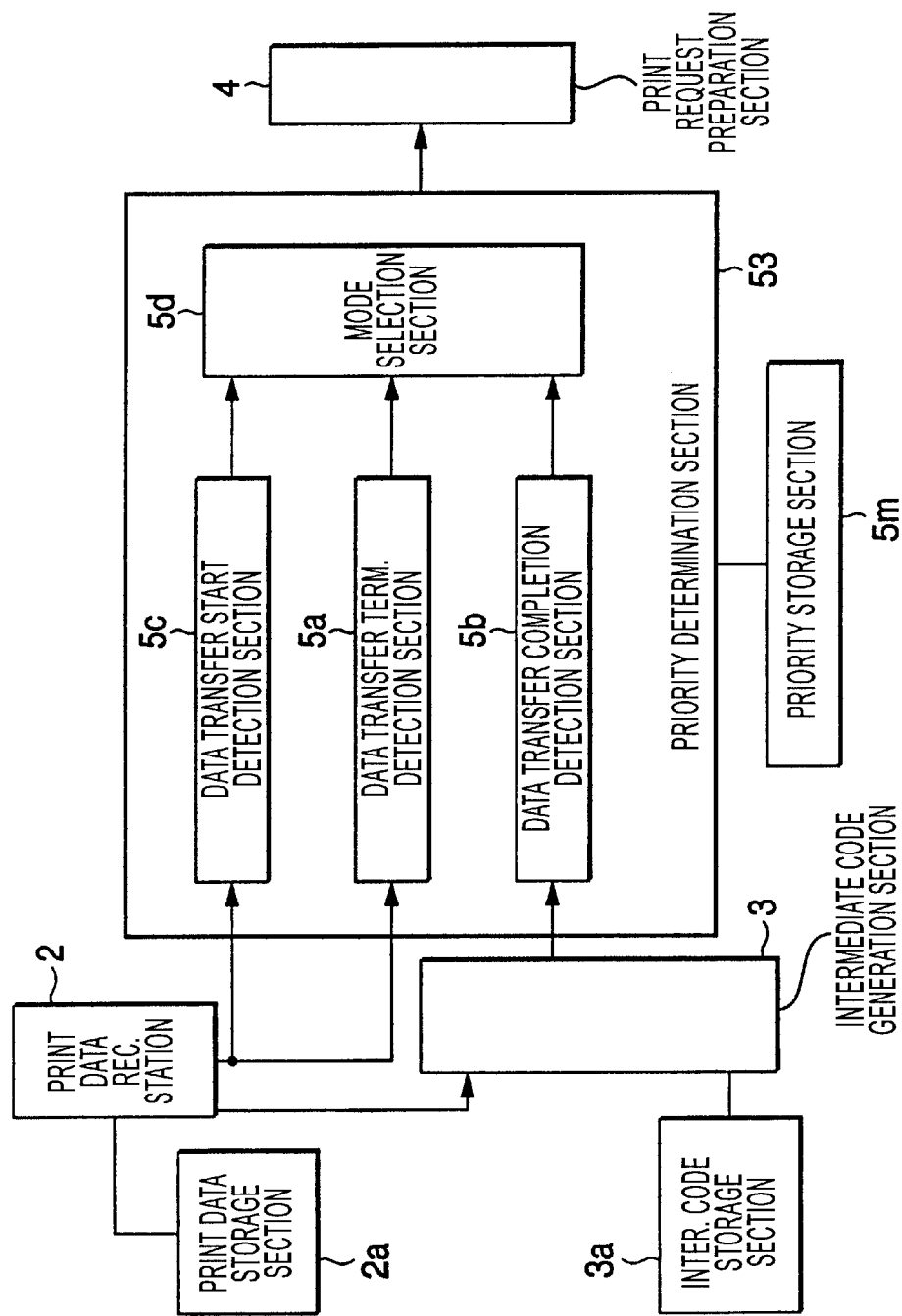
FIG. 7 is a functional block diagram of the main part of a printer according to a third embodiment of the invention.

FIG. 7 is a functional block diagram of the main part of a printer according to a third embodiment of the invention.

In the embodiment, a priority determination section 53 is made up of the above-described data transfer termination detection section 5a, data storage completion detection section 5b, and priority storage section 5m, and a data transfer start detection section 5c for detecting the transfer start time of print data and a mode selection section 5d for selecting any of the detection results of the detection sections 5a–5c as a priority determination criterion. Other components of the printer are the same as those of the printer 1 of the first embodiment.

In the third embodiment, the mode selection section 5d enables selection of one of a first priority mode for assigning high execution priorities to print jobs in the print data transfer termination order, a second priority mode for assigning high execution priorities to print jobs in the intermediate code storage completion order in an intermediate code storage section 3a, and a third priority mode for assigning high execution priorities to print jobs in the print data transfer start order. Mode selection of the mode selection section 5d can be executed in response to a user command, for example.

Figure 8:
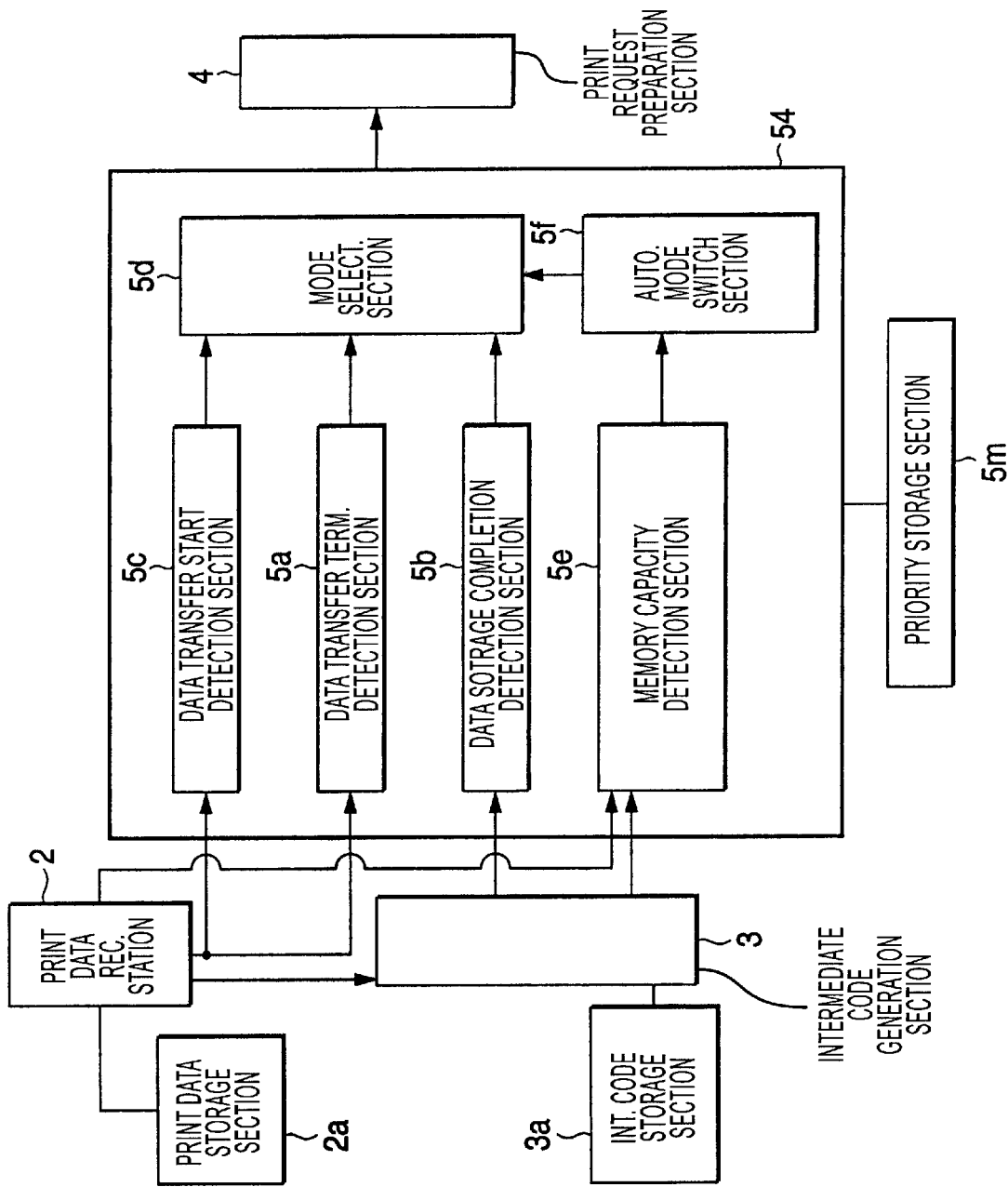
FIG. 8 is a functional block diagram of the main part to show an application example of the printer according to the third embodiment of the invention.

As an application example, a priority determination section 54 can also be provided with a memory capacity detection section 5e and an automatic mode switch section 5f in addition to the components of the priority determination section 53 for automatically selecting one of the modes, as shown in FIG. 8.

In FIG. 8, the memory capacity detection section 5e detects an available memory capacity in a print data storage section 2a and an intermediate code storage section 3a, and the automatic mode switch section 5f controls the mode selection section 5d based on the detection value for automatically switching the mode among the first to third priority modes.

Figure 9:
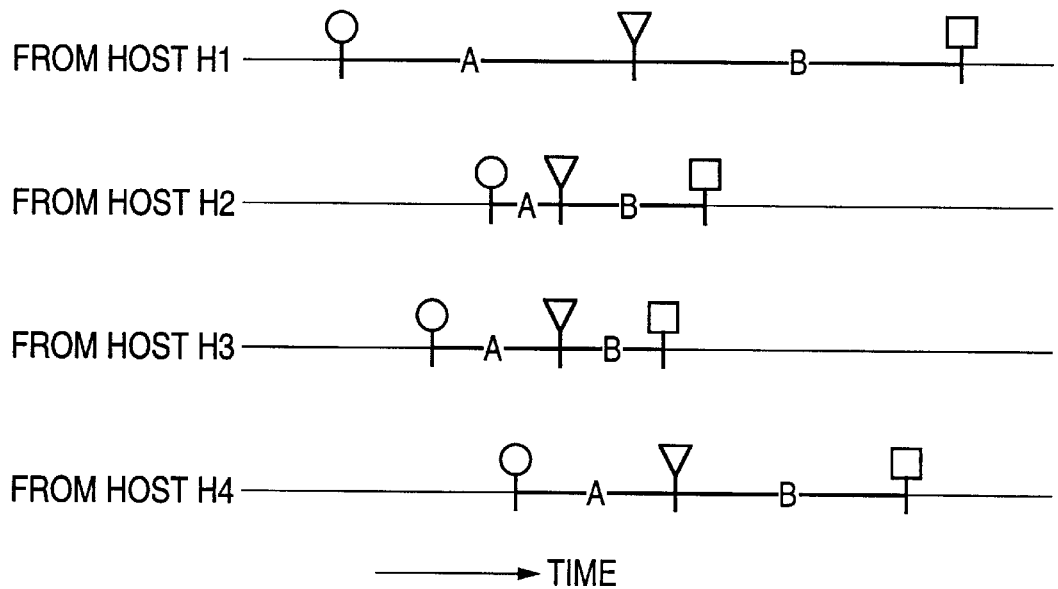
FIG. 9 is a timing chart to explain the print job processing order in the third embodiment of the invention.

An operation example of the printer according to the embodiment will be discussed with reference to FIG. 9.

If each storage section can have a sufficient available memory capacity provided as a result of detection of the memory capacity detection section 5e, the automatic mode switch section 5f causes the mode selection section 5d to select the second priority mode. At this time, print jobs from hosts H1–H4 are not made to wait in the state of print data being stored (A) and real image data is generated and stored (B) in parallel, as described in the second embodiment. Print requests are issued in the intermediate code storage completion order for executing printing.

On the other hand, for example, if the intermediate code storage section 3a has an available memory capacity equal to or less than a predetermined threshold value although the print data storage section 2a has a sufficient available memory capacity, the automatic mode switch section 5f causes the mode selection section 5d to select the first priority mode. At this time, for the print jobs from the hosts H1–H4, print data is received and stored (A) in parallel, but intermediate code is generated and stored (B) and print requests are issued in the print data transfer termination order. If the print data storage section 2a has an available memory capacity equal to or less than a predetermined threshold value, the third priority mode is selected and for the print jobs from the hosts H1–H4, intermediate code is generated and stored (B) and print requests are issued in the print data transfer start order as with the conventional printer. Then, the optimum priority determination for the current printer state is enabled.

4th Embodiment

Figure 10:
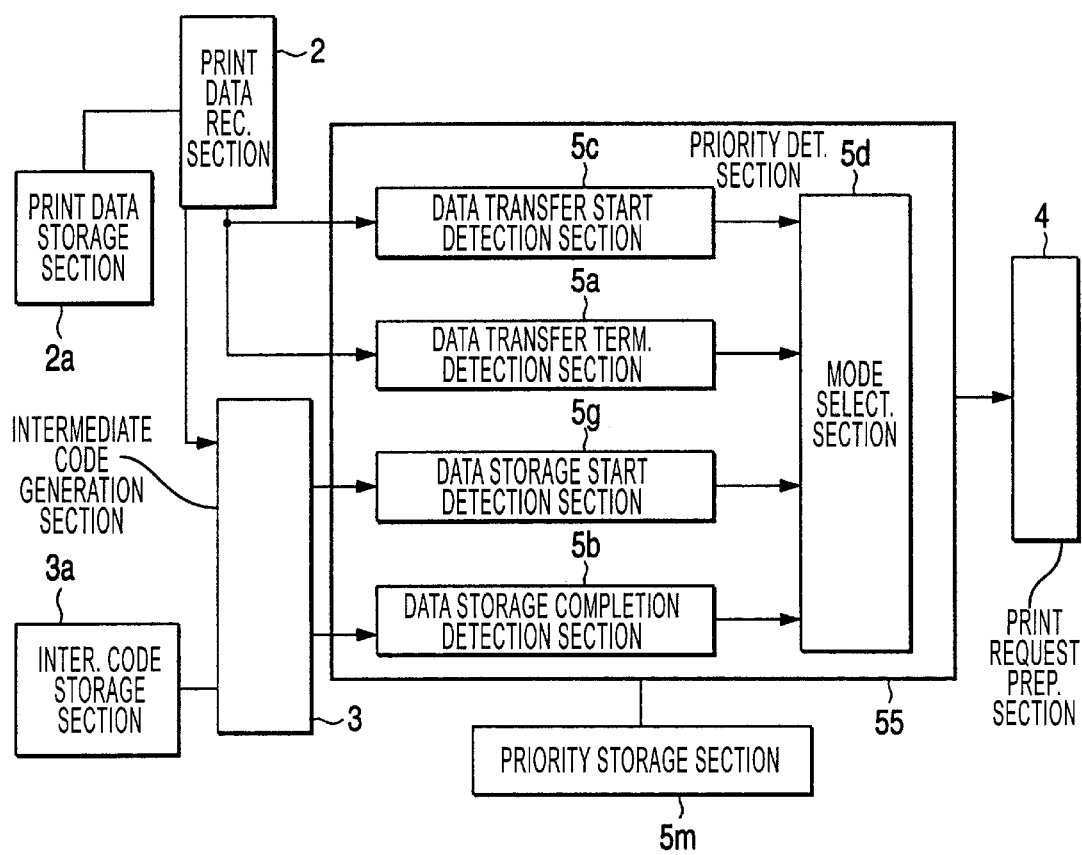
FIG. 10 is a functional block diagram of the main part of a printer according to a fourth embodiment of the invention.

FIG. 10 is a functional block diagram of the main part of a printer according to a fourth embodiment of the invention.

In the embodiment, a priority determination section 55 is made up of the above-described data transfer termination detection section 5a, data storage completion detection section 5b, and data transfer start detection section 5c, and a data storage start detection section 5g for detecting the storage start time of intermediate code of print data, a mode selection section 5d for selecting any of the detection results of the detection sections 5a–5c and 5g as a priority determination criterion, and a priority storage section 5m for storing the priority determined based on the detection result of the detection section selected by the mode selection section 5d. Other components of the printer are the same as those of the printer 1 of the first embodiment.

In the fourth embodiment, the mode selection section 5d enables selection of one of a first priority mode for assigning high execution priorities to print jobs in the print data transfer termination order, a second priority mode for assigning high execution priorities to print jobs in the intermediate code storage completion order in an intermediate code storage section 3a, a third priority mode for assigning high execution priorities to print jobs in the print data transfer start order, and a fourth priority mode for assigning high execution priorities to print jobs in the storage start time order of the intermediate code in the intermediate code storage section 3a. Mode selection of the mode selection section 5d can be executed in response to a user command, for example.

An automatic mode switch section can also be provided for automatically switching the mode among the first to fourth priority modes as in the application example of the third embodiment described above.

5th Embodiment

Figure 11:
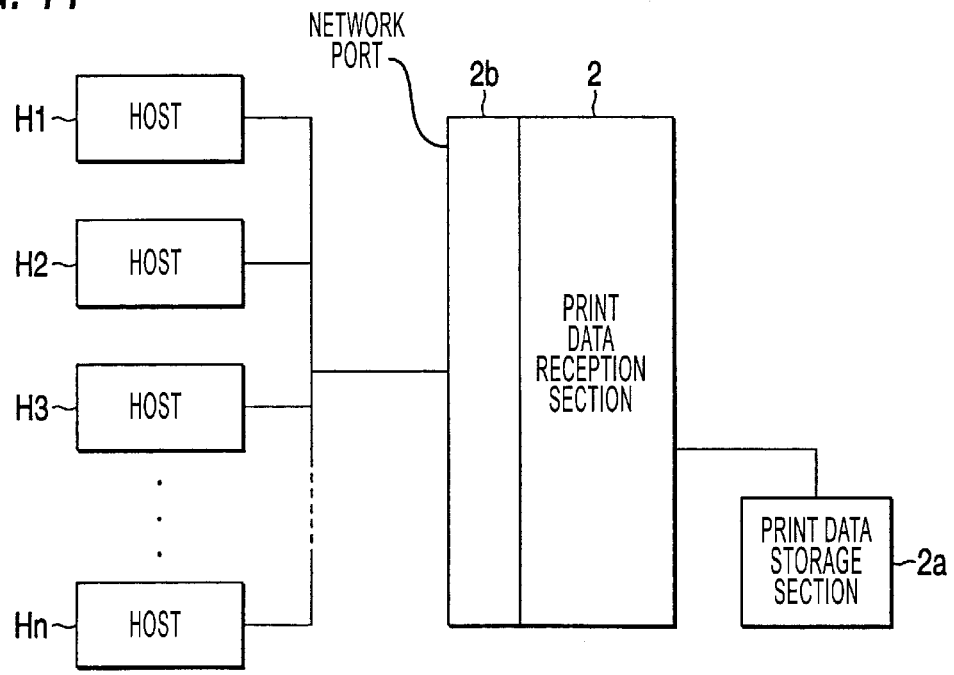
FIG. 11 is a schematic-block diagram of a print data reception section according to a fifth embodiment of the invention.

The description of the first to fourth embodiments assumes that the print data reception section 2 has a plurality of input ports provided in a one-to-one correspondence with the hosts H1–H4. However, for example, as shown in FIG. 11, print jobs from hosts H1–Hn and print data accompanying the print jobs can also be received by one network port 2b and the above-described CPU in parallel. That is, while data is being received from one host, if data is received from another host, the print data is received by the current reception program being executed in parallel while the CPU is time-shared, whereby processing can be performed as if a plurality of input ports were provided.

Figure 12:
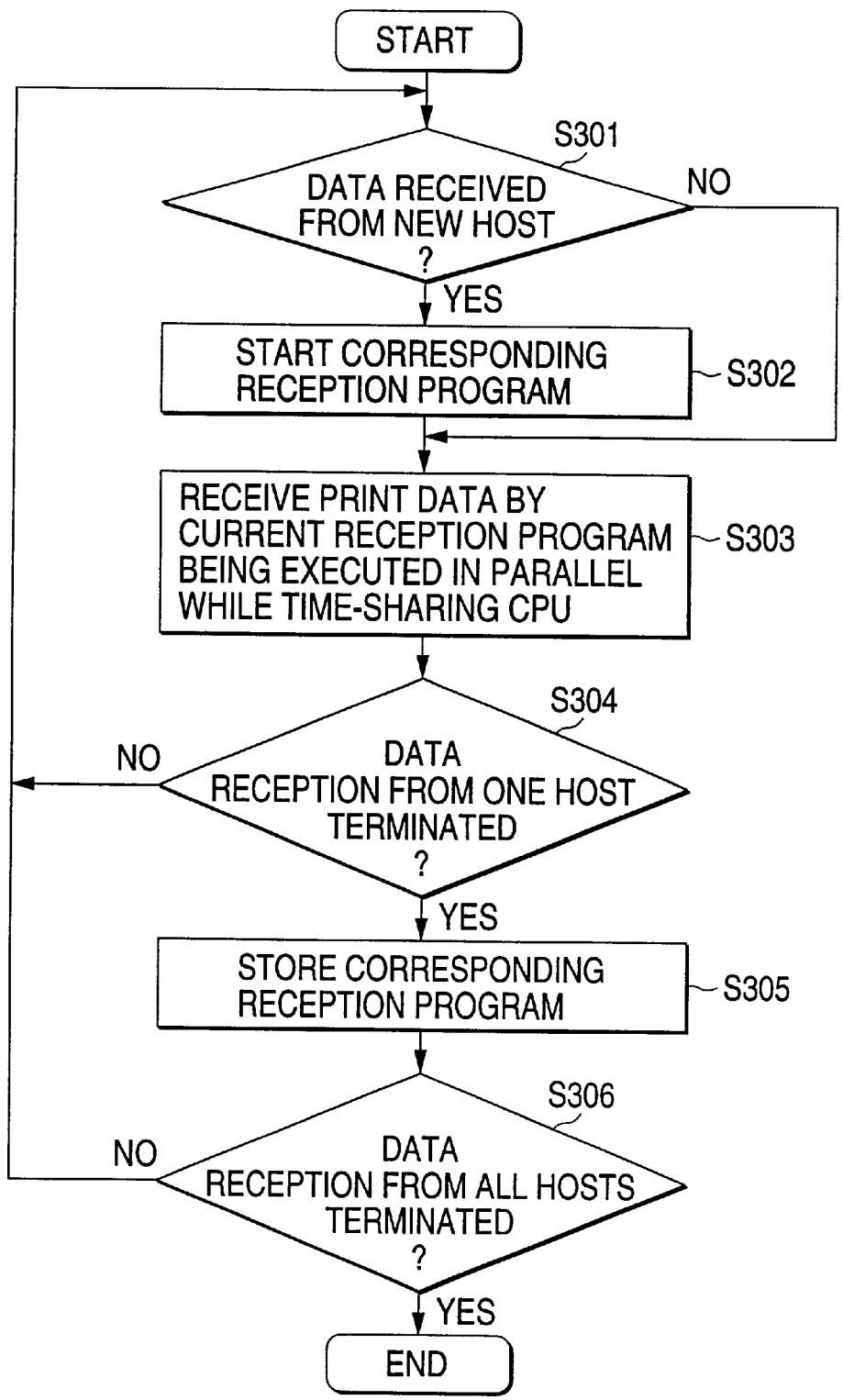
FIG. 12 is a flowchart to explain a print data reception process procedure according to each embodiment of the invention.

FIG. 12 shows an example of a parallel reception procedure of print jobs from the hosts H1–H4 connected to a plurality of input ports or the hosts H1–Hn connected to the network port 2b and the print data accompanying the print jobs, as described in the first to fifth embodiments.

In FIG. 12, while data is being received from one host, if data is received from another host, namely, if a request for receiving a print job and its accompanying print data is received at step S301, the print data reception section 2 starts the corresponding reception program at step S302 and receives the print data by the current reception program being executed in parallel while time-sharing the CPU at step S303. The received print data is stored in the corresponding area of the print data storage section 2a in sequence. If data reception from one host is terminated at step S304, the print data reception section 2 stops and stores the corresponding reception program at step S305. The steps are executed for all hosts and when data reception from all hosts terminates at step S306, the data reception process is terminated.

Figure 13:
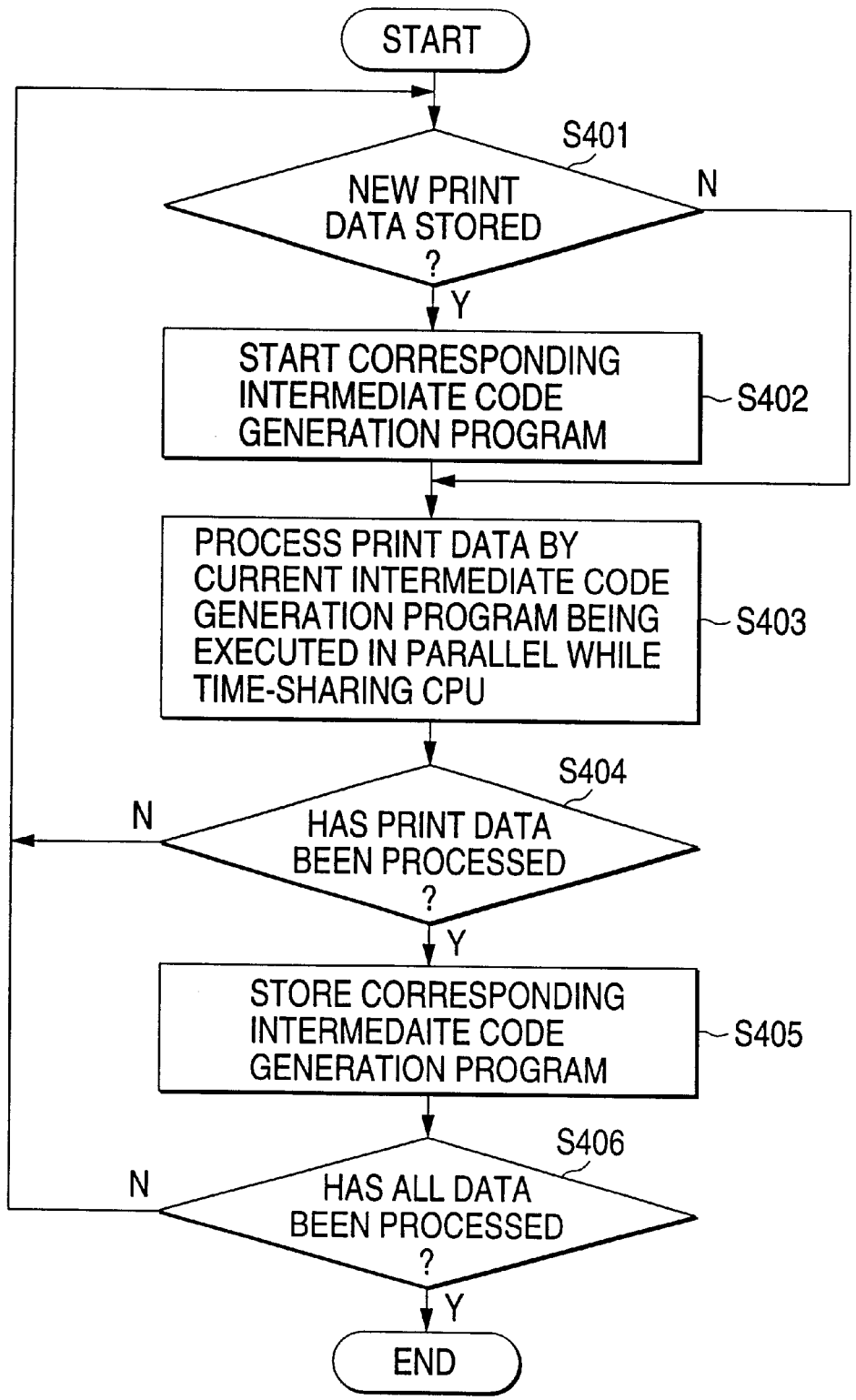
FIG. 13 is a flowchart to explain an intermediate code generation process procedure from print data according to each embodiment of the invention.

FIG. 13 shows an example of a procedure of the intermediate code generation section 3 for converting print data received from the hosts and stored in the corresponding areas of the print data storage section 2a in sequence into intermediate code in parallel, as described in the first to fifth embodiments.

In FIG. 13, while one print data piece is being converted into intermediate code, if another print data piece is stored, namely, if a request for converting print data into intermediate code is made at step S401, the intermediate code generation section 3 starts the corresponding intermediate code generation program at step S402 and converts the print data into intermediate code by the current intermediate code generation program being executed in parallel while time-sharing the CPU at step S403. If conversion of one print data piece into intermediate code terminates at step S404, the intermediate code generation section 3 stores the corresponding intermediate code generation program at step S405. The steps are executed for all print data and when conversion of all print data into intermediate code is terminated at step S406, the intermediate code generation process is terminated.

Starting the corresponding program at step S302, S402, storing the corresponding program at step S304, S405 in the parallel data reception processing or the parallel intermediate code generation processing described above refers to, for example, a case where when one data reception processing or intermediate code generation processing program stored on a ROM (read-only memory) or HD (hard disk) is executed on the ROM, it is copied into a RAM (random access memory) and the copy program is executed on the RAM for parallel execution of both the programs while time-sharing the CPU, a case where a plurality of programs, such as programs corresponding to languages, are stored in the ROM from the beginning and are executed in parallel while the CPU is time-shared, or a case where data reception processing or intermediate code generation processing program stored on the ROM, etc., is reentrant and more than one process can be executed in parallel as required while the CPU is time-shared.

The tasks of the print data reception section 2, the intermediate code generation section 3, the print request preparation section 4, and the priority determination section 51 are executed in parallel while the CPU is time-shared, as described above. That is, the data reception process task and the intermediate code generation process task described above are executed in parallel while the CPU is time-shared. These tasks are assigned priorities and generally are executed in time units of several-msec order alternately based on the priorities. To execute various tasks alternately, for example, a real time monitor of an aggregate of programs executed in the order of 1 msec or less determines which task the use right of the CPU is to be passed to while referencing the priorities of the tasks, etc.

6th Embodiment

In a sixth embodiment of the invention, representative process flows of tasks will be discussed. The process flows discussed below are based on the fourth embodiment shown in FIG. 10. Print data reception tasks, for example, print data reception tasks 1–3 are executed as process execution tasks of the print data reception section 2 for receiving print data. Intermediate code generation tasks, for example, intermediate code generation tasks 1–3 are executed as process execution tasks of the intermediate code generation section 3 for converting reception data into intermediate code. Priority determination task determines the priority of the each print jobs. Print request preparation tasks, for example, print request preparation tasks 1–3 are executed as process execution tasks of the print request preparation section 4 for issuing a print request based on the generated intermediate code. The process flow of each task will be discussed by taking task 1 as a representative task.

For example, three output trays 1–3 are provided as output trays onto which the print mechanism 6 outputs print results although the output trays are not discussed in the embodiments, and the print results provided by executing print jobs in parallel can be output to different output trays.

In the embodiments, after the print data reception section 2 receives all print data, the intermediate code generation section 3 starts generation of intermediate code, and when intermediate code for all pages of one print job has been stored, the print request preparation section 4 issues a print request in batch. Aside from this manner, for example, upon completion of reception of print data for one page, two pages, or a predetermined number of pages, intermediate code generation can be started and upon completion of generation of intermediate code for one page, two pages, or a predetermined number of pages, a print request for the intermediate code can also be prepared and issued to the print mechanism 6. The total number of print pages is contained in print data as information and when the first print request for one print job is prepared, information on the total number of print sheets of paper is also contained. In the description that follows, the number of print sheets corresponding to one print request, n[1] (corresponding to print job 1), is a fixed number of sheets, but the value may change dynamically.

Figure 14:
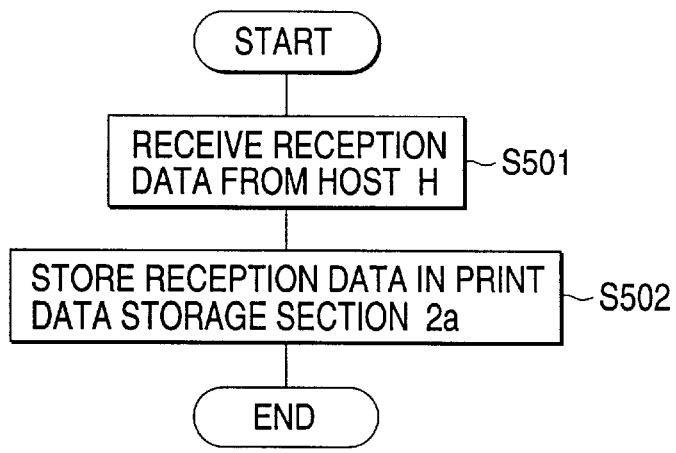
FIG. 14 is flowchart to show a process of a print data reception task.

FIG. 14 shows a process of print data reception task 1. As shown here, first, reception data is received from host H at step S501, then is stored in the print data storage section 2a at step S502.

Figure 15:
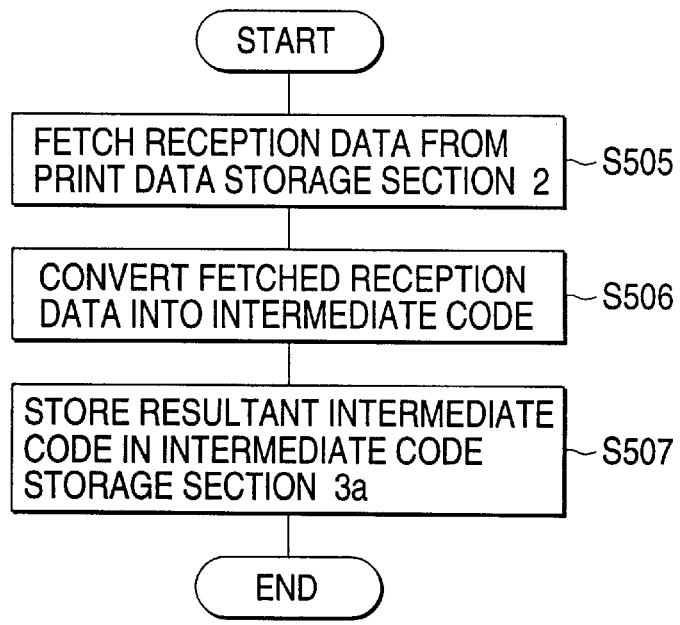
FIG. 15 is flowchart to show a process of an intermediate code generation task.

FIG. 15 shows a process of intermediate code generation task 1. As shown here, first, reception data is fetched from the print data storage section 2a at step S505, the fetched reception data is converted into intermediate code at step S506, and the resultant intermediate code is stored in the intermediate code storage section 3a at step S507.

Figure 16:
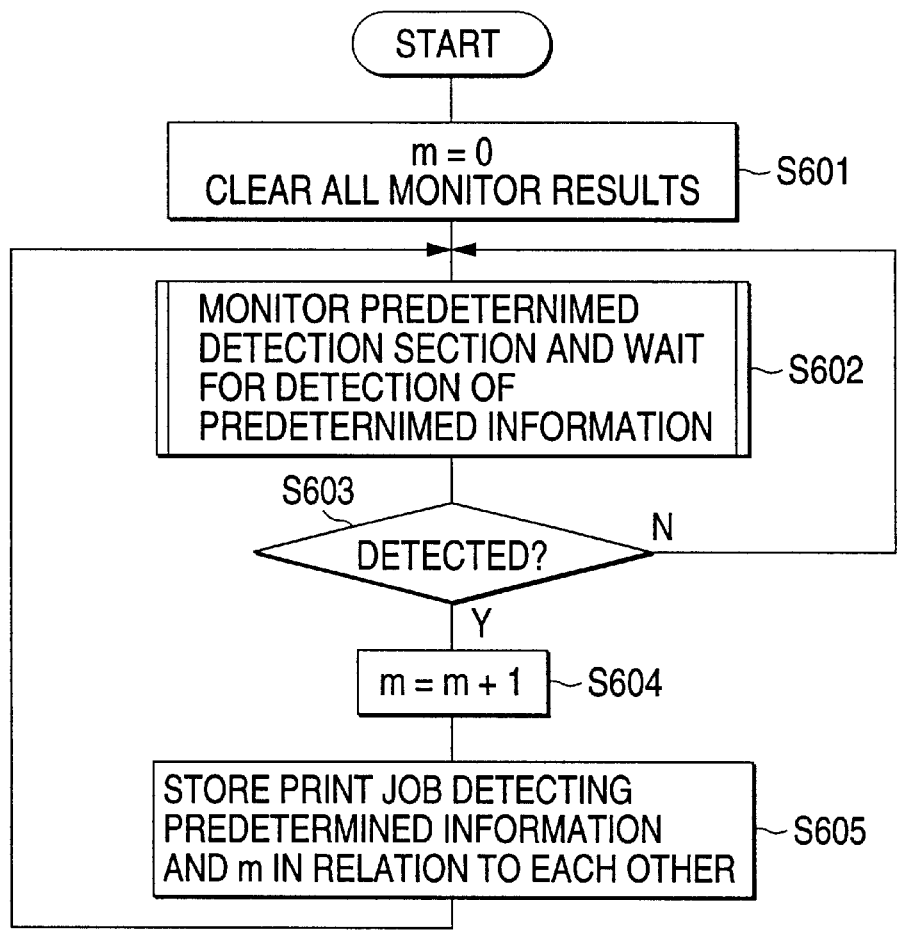
FIGS. 16(A) and 16(B) show a process of a priority determination task.

FIG. 16(A) shows a process of a priority determination task. The priority determination task determines m indicating the priority and sets m in a table as shown in FIG. 16(B) in relation to print jobs.

As shown in FIG. 16(A), first, m=0 is set and all monitor results are cleared at step S601. A predetermined detection section corresponding to the priority mode selected by the mode selection section 5d among the first to fourth priority modes is monitored at step S602 and a wait is made for detection of predetermined information at step S603. If the predetermined information is detected at step S603, m is incremented by one at step S604 and is stored in the priority storage section 5m, for example, as a table as shown in FIG. 16(B) in relation to the number-of the print job detecting the predetermined information at step S605.

Step 603 waiting for detection of the predetermined information varies depending on which mode the mode selection section 5d selects. Specific examples are shown in FIGS. 17 to 20.

Figure 17:
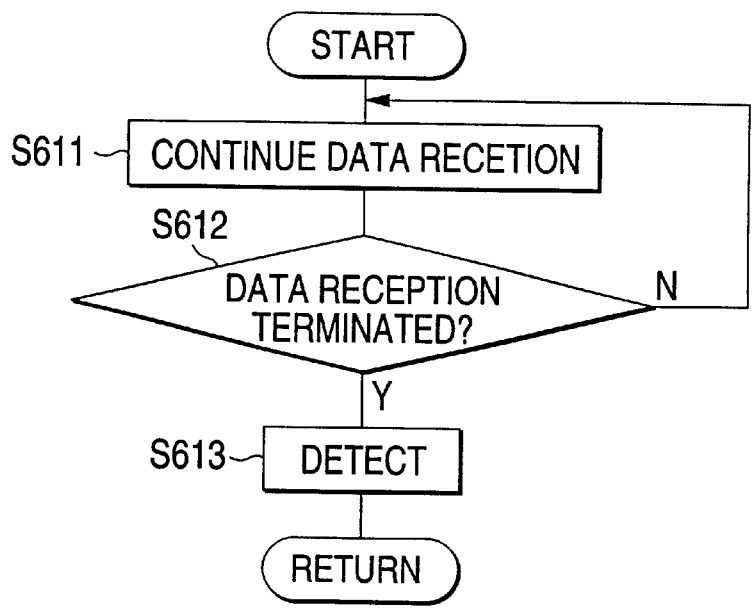
FIG. 17 is a flowchart to show a detection process of a data transfer termination detection section.

In FIG. 17, the first priority mode is selected for assigning high execution priorities to print jobs in the print data transfer termination detection order of the data transfer termination detection section 5a. When data reception is continued at step S611, whether or not data reception terminates is determined. If the data reception is determined to terminate at step S612, the print data transfer termination is detected at step S613.

Figure 18:
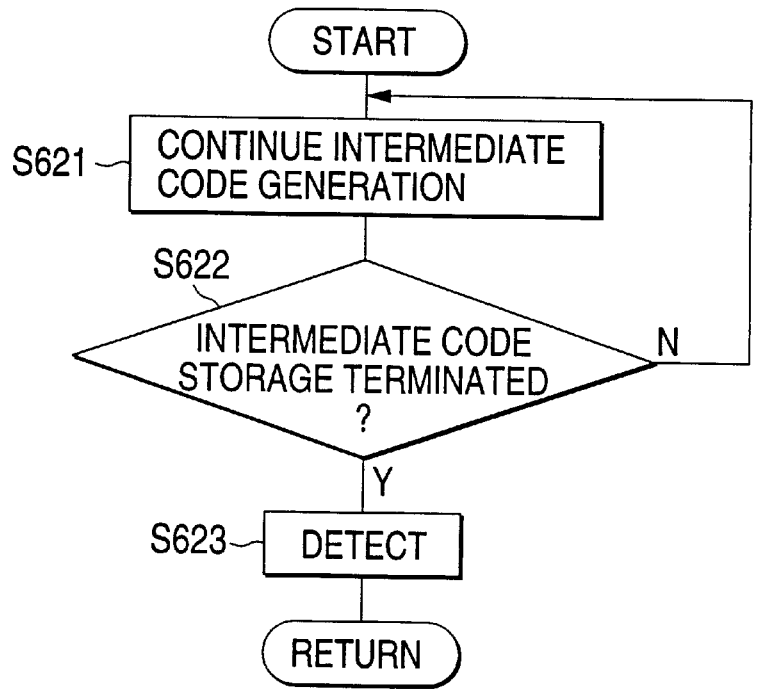
FIG. 18 is a flowchart to show a detection process of a data storage completion detection section.

In FIG. 18, the second priority mode is selected for assigning high execution priorities to print jobs in the intermediate code storage completion detection order of the data storage completion detection section 5b. When intermediate code generation is continued at step S621, whether or not intermediate code storage is complete is determined. If the intermediate code storage is determined to be complete at step S622, the intermediate code storage completion is detected at step S623.

Figure 19:
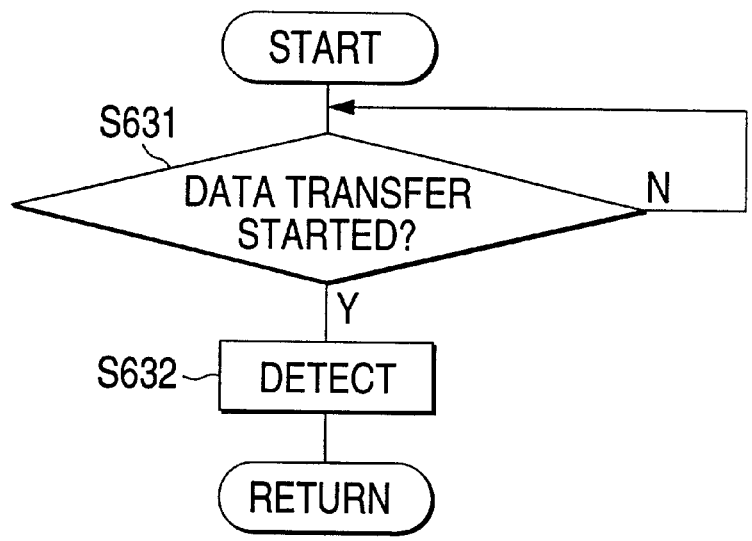
FIG. 19 is a flowchart to show a detection process of a data transfer start detection section.

In FIG. 19, the third priority mode is selected for assigning high execution priorities to print jobs in the print data transfer start detection order of the data transfer start detection section 5c. Whether or not data transfer is started is determined. If the data transfer is determined to be started at step S631, the print data transfer start is detected at step S632.

Figure 20:
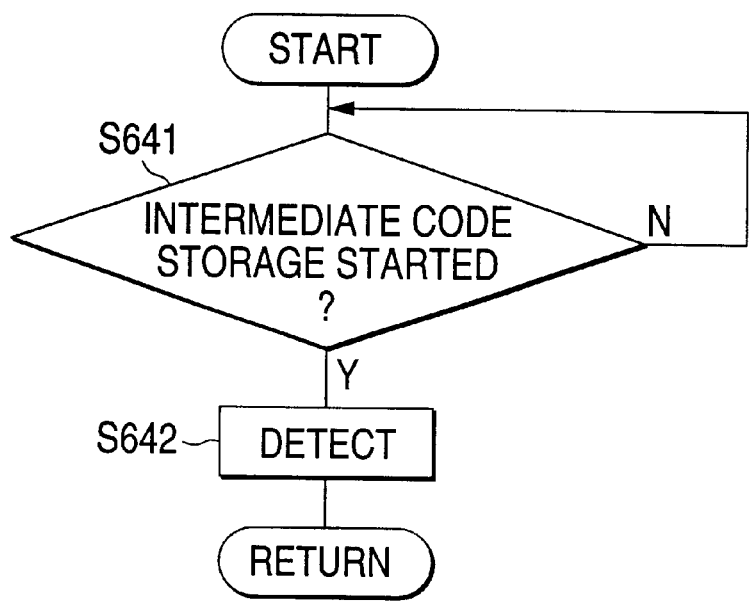
FIG. 20 is a flowchart to show a detection process of a data storage start detection section.

In FIG. 20, the fourth priority mode is selected for assigning high execution priorities to print jobs in the intermediate code storage start detection order of the data storage start detection section 5g. Whether or not intermediate code storage is started is determined. If the intermediate code storage is determined to be started at step S641, the intermediate code storage start is detected at step S642.

Figure 21:
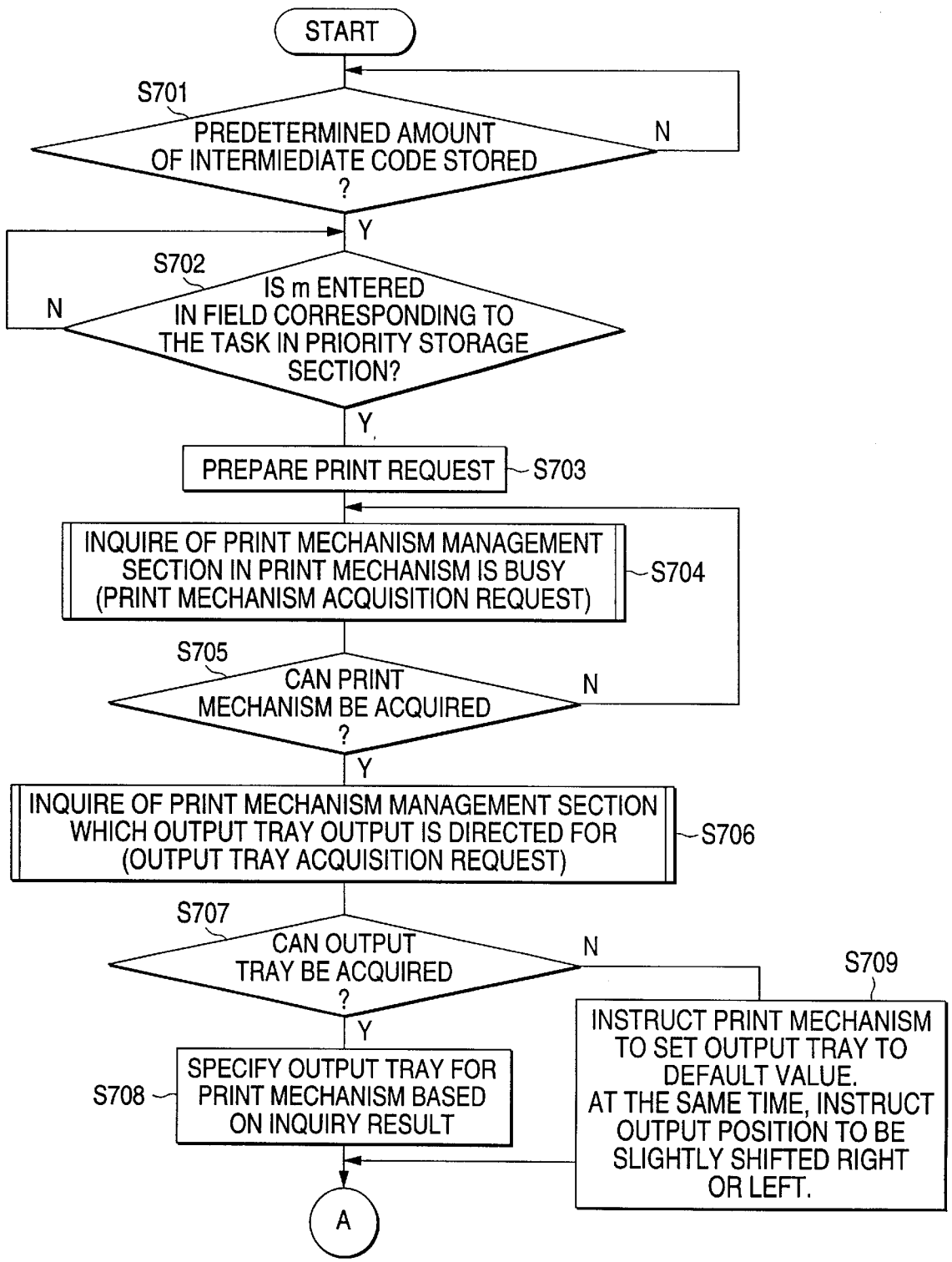
FIG. 21 is a flowchart to show a process of a print request preparation task.
Figure 22:
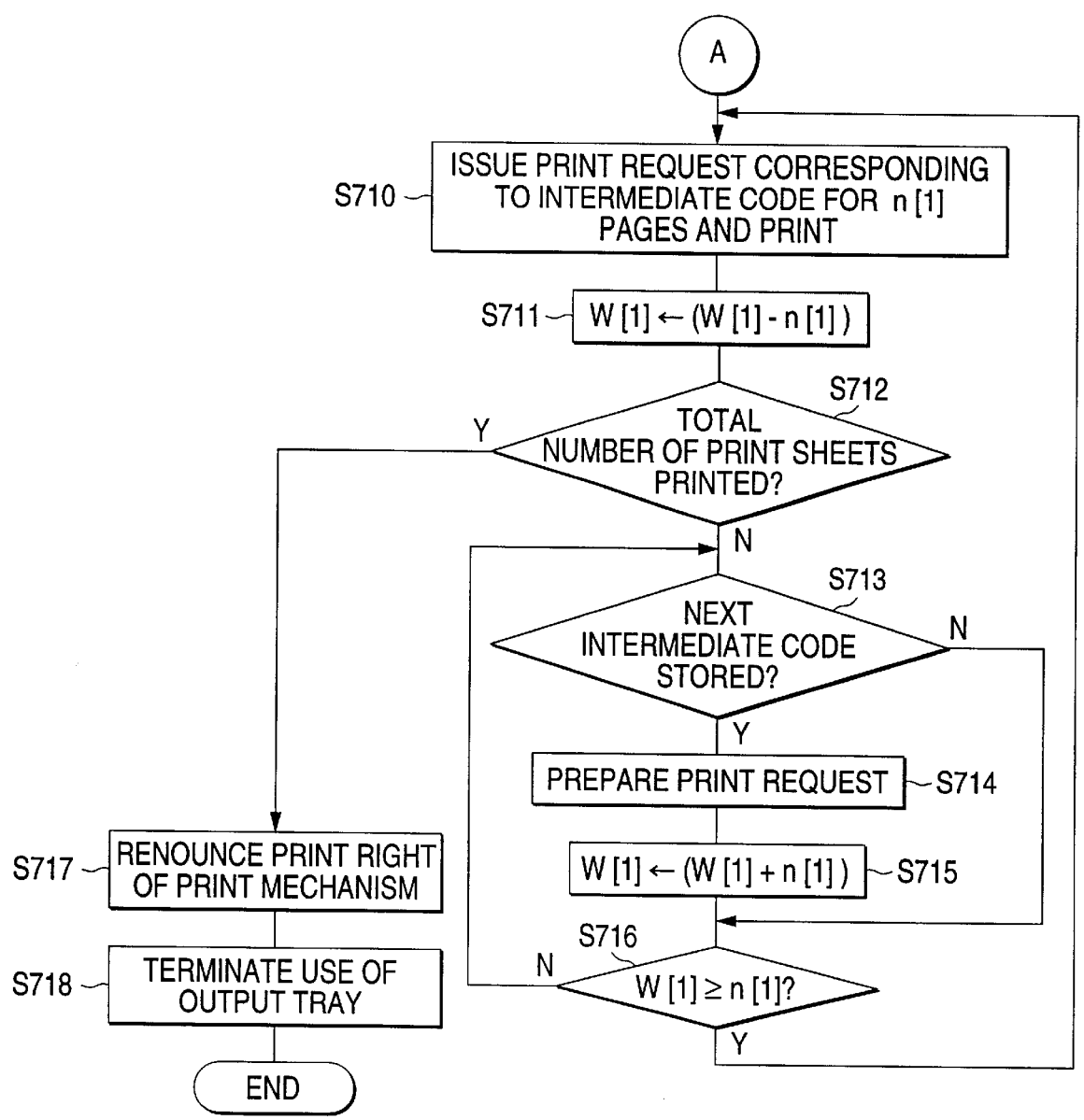
FIG. 22 is a flowchart to show a process of a print request preparation task (continued)

FIGS. 21 and 22 show a process of print request preparation task 1. The print request preparation task 1 prepares print requests corresponding to generated intermediate code by the print request preparation means normally in the reception acceptance order or based on the priorities determined by the above-described priority determination task, and executes printing based on the prepared print requests in a predetermined procedure.

As shown in FIGS. 21 and 22, first whether or not intermediate code for a predetermined number of pages has been stored is determined at step S701. If the intermediate code has been stored, whether or not m is entered in the field corresponding to the print job number of the task in FIG. 16(B) in the priority storage section 5m is determined at step S702. If m is not entered in the field corresponding to the task at step S702, it is determined that the execution priority is not assigned to the task, and step S702 is repeated. If m is entered in the field corresponding to the task at step S702, a print request is prepared at step S703, then a print mechanism acquisition request to inquire whether or not the print mechanism 6 is busy is issued at step S704. This print mechanism acquisition request is to call a subroutine described later. If the print mechanism cannot be acquired at step S705, control returns to step S704. If the print mechanism can be acquired at step S705, an output tray acquisition request to inquire which output tray output is directed for is issued at step S706. This output tray acquisition request is to call a subroutine described later. If an output tray can be acquired at step S707, the output tray is specified for the print mechanism 6 based on the inquiry result at step S708. If no output tray can be acquired at step S707, the print mechanism 6 is instructed to set output tray to a default value and slightly shift the output position right or left at step S709.

Next, a print request corresponding to the intermediate code for n[1] pages of a print unit is issued to the print mechanism 6 and printing is executed at step S710. (W[1] −n[1]) is entered in W[1] indicating the number of unprinted pages of data whose intermediate code has been generated at step S711, then whether or not a total number of print sheets have been printed is determined at step S712. If the printed output does not reach the total-number, whether or not the next intermediate code has been stored is determined at step S713. If the intermediate code has been stored, a print request is prepared at step S714 and the number of unprinted sheets, W[1], is incremented by the number of print sheets specified in the print request, n[1], at step S715. Then, control goes to step S716. If the intermediate code is not stored, control also goes to step S716 at which whether or not W[1] is equal to or greater than n[1] is determined at step S716. If W[1] is equal to or greater than n[1] at step S716, control returns to step S710 and n[1] pages are printed. If W[1] is less than n[1] at step S716, control returns to step S713 and a wait is made for storage of the next intermediate code.

On the other hand, if it is determined at step S712 that a total number of print sheets have been printed, the print right of the print mechanism 6 is renounced at step S717, then use of the output tray is terminated at step S718.

Figure 23:
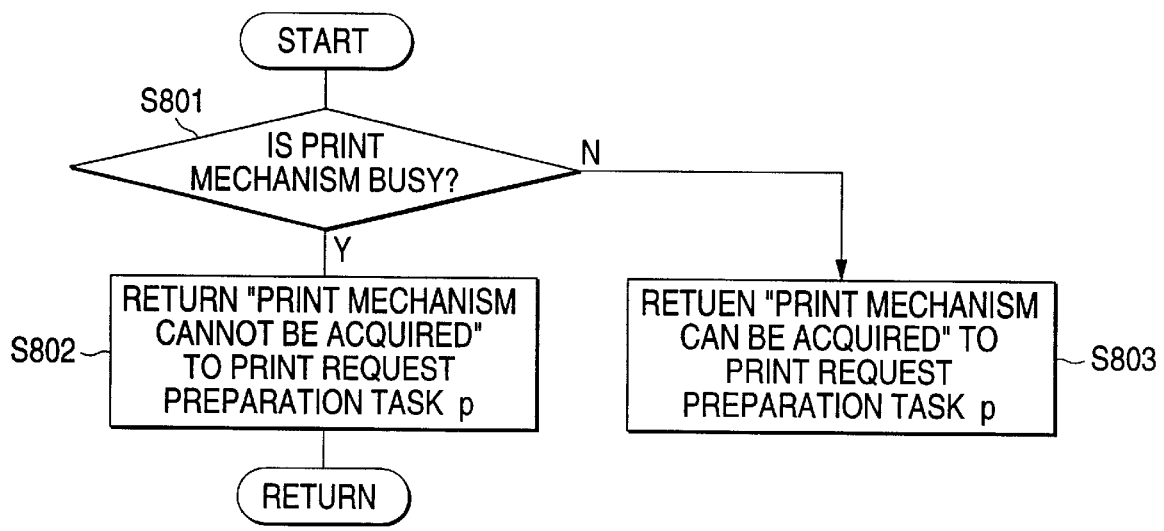
FIG. 23 is a flowchart to show a print mechanism acquisition request subroutine.

FIG. 23 shows a process flow of a print mechanism acquisition request subroutine called at step S704 in FIG. 21. As shown in FIG. 23, first whether or not the print mechanism is busy is determined. If the print mechanism is busy at step S801, a message of "print mechanism cannot be acquired" is returned to the inquiring print request preparation task p at step S802 (p indicates the number of the inquiring print request preparation task; in this case, p is 1). On the other hand, if the print mechanism 6 is not busy at step S801, a message of "print mechanism can-be acquired" is returned to the print request preparation task p at step S803.

Figure 24:
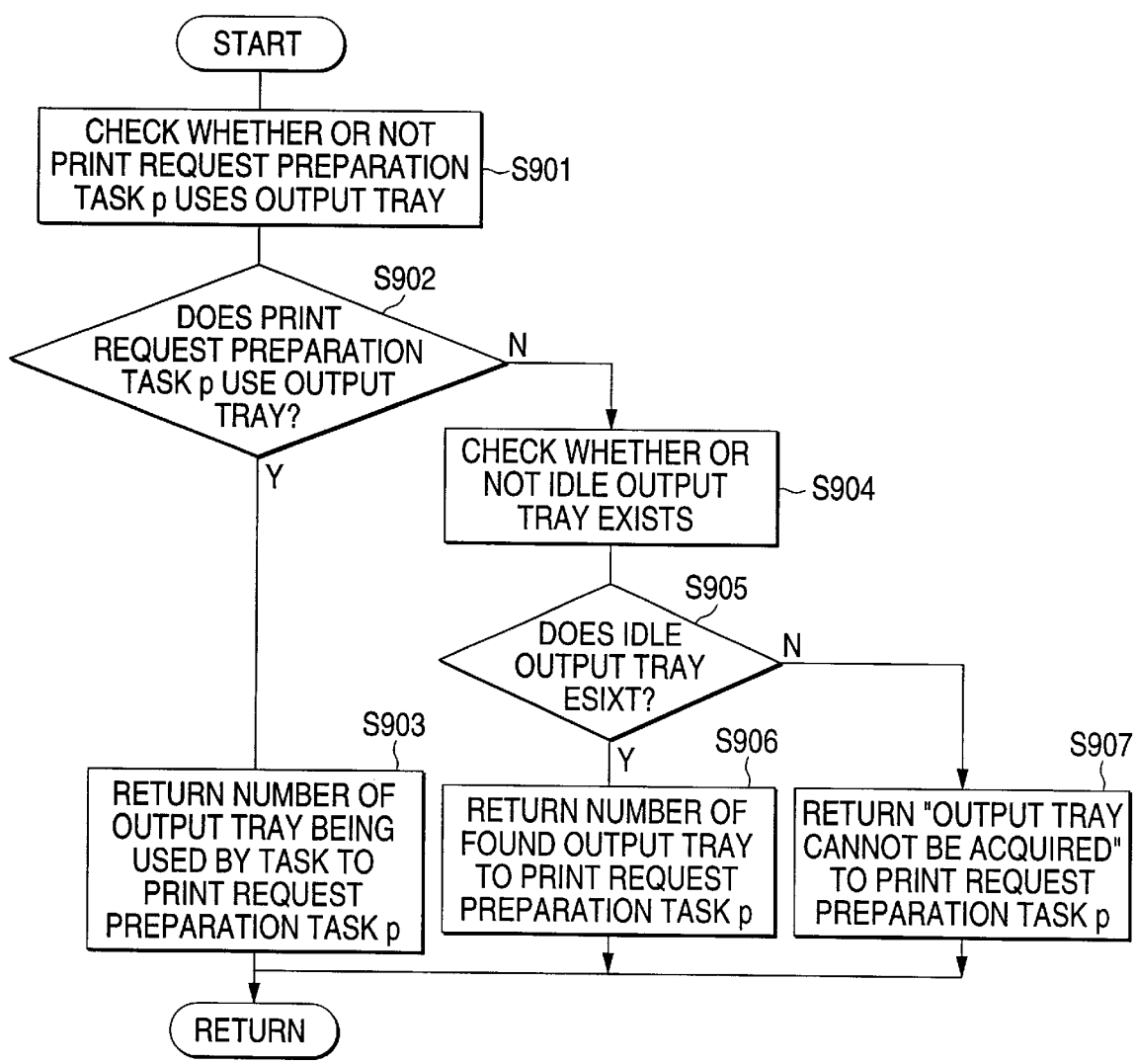
FIG. 24 is a flowchart to show an output tray acquisition request subroutine.

FIG. 24 shows a process flow of an output tray acquisition request subroutine called at step S706 in FIG. 21. As shown in FIG. 24, first whether or not print request preparation task p uses an output tray is checked at step S901. If the task p uses an output tray at step S902, the number of the output tray being used by the task is returned to the requesting print request preparation task p at step S903. If the task does not use any output tray at step S902, whether or not an idle output tray exists is checked at step S904. If an idle output tray is found at step S905, the number of the found idle output tray is returned to the print request preparation task p at step S906. If an idle output tray is not found at step S905, a message of "output tray cannot be acquired" is returned to the print request preparation task p at step S907.

Figure 25:
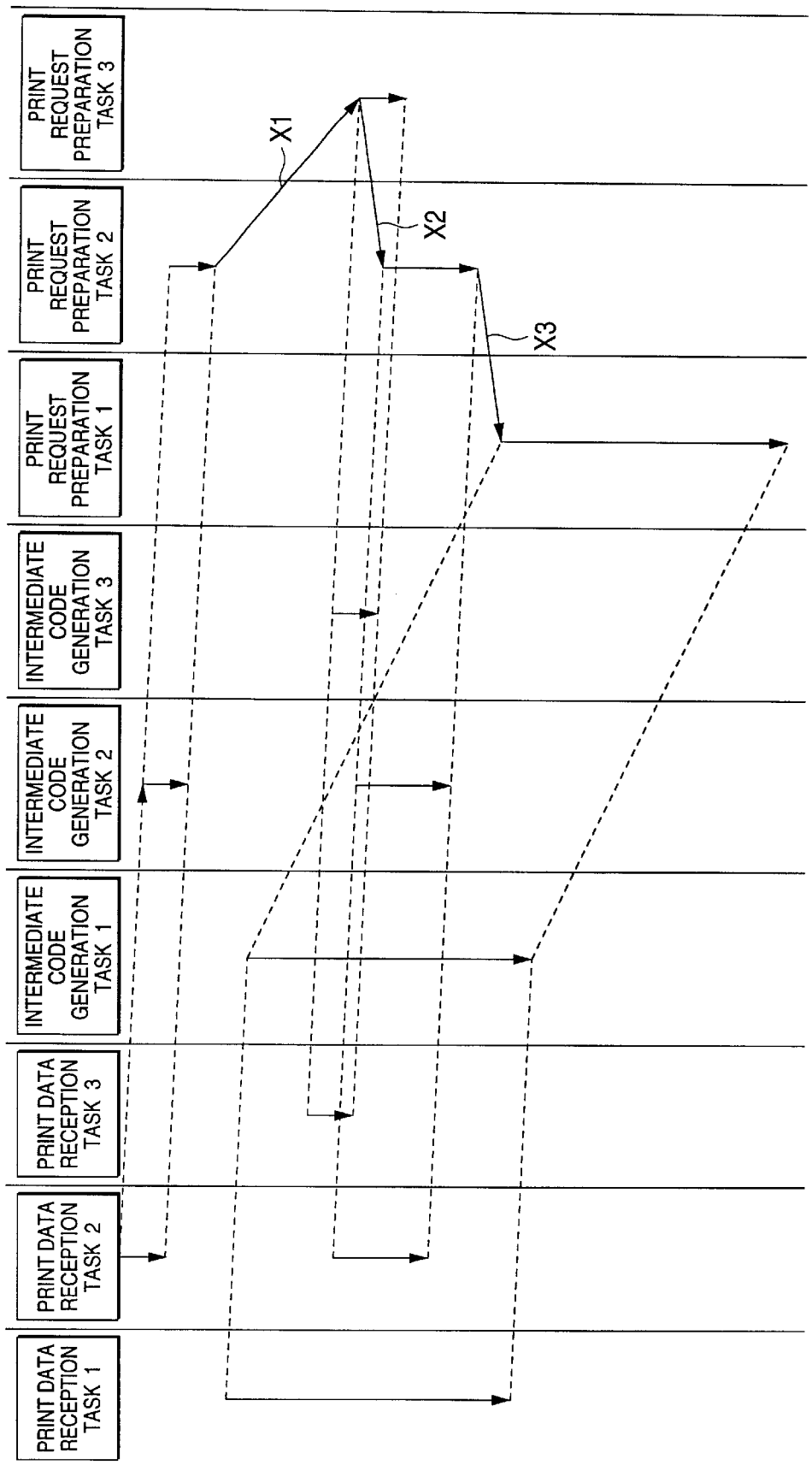
FIG. 25 is a timing chart to show an example of whole processing of the tasks.

FIG. 25 shows an example of the whole flow of processing shown in FIGS. 14 to 24. In FIG. 25, print requests are issued in the predetermined intermediate code storage completion order determined by the priority determination section. First, data from the host H2 is received, print data reception task 2 is executed, and intermediate code generation task 2 and print request preparation task 2 are executed in sequence. Next, data from the host H1 is received, so that print data reception task 1 and intermediate code generation task 1 are executed. However, during the reception of the data from the host H1, since data from the hosts H2 and H3 are also received, print data reception task 2, intermediate code generation task 2, print data reception task 3 and intermediate code generation task 3 are also executed. Hereupon, since the intermediate code generation task 3 issues a print request earlier than the intermediate code generation tasks 1 and 2, the print request preparation task 3 is execute (X1). At this time, not only the print request preparation task 1 but also the print request preparation task 2 are placed in a print wait state, but the print mechanism is shifted to the print request preparation task 2 issuing a print request earlier (X2), then shifted to the print request preparation task 1 (X3).

The example shown in FIG. 25 uses the priority mode for preparing print requests in the predetermined intermediate code storage completion order. If the priority mode for issuing print requests in the print data reception start order is set, the order of the printing is as follows. That is, the first job from the host H2 is printed, and the job from the host H1 is printed. Thereafter, the second job from the host H2 is printed, and then the job from the host H3 is printed. Thus, the printing order in the priority mode of the print data reception start order is completely different from that in the priority mode of the predetermined intermediate code storage completion order aforementioned above.

MODIFICATIONS

Figure 26:
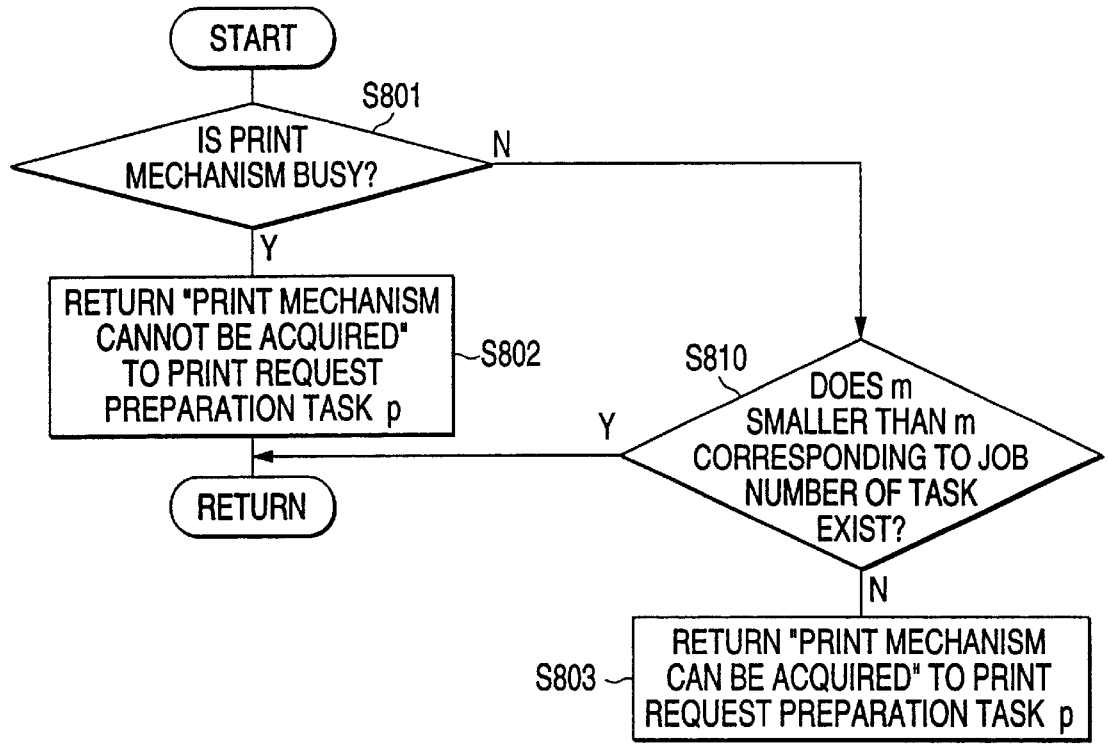
FIG. 26 is a flowchart to show another process of the print mechanism acquisition request subroutine.
Figure 27:
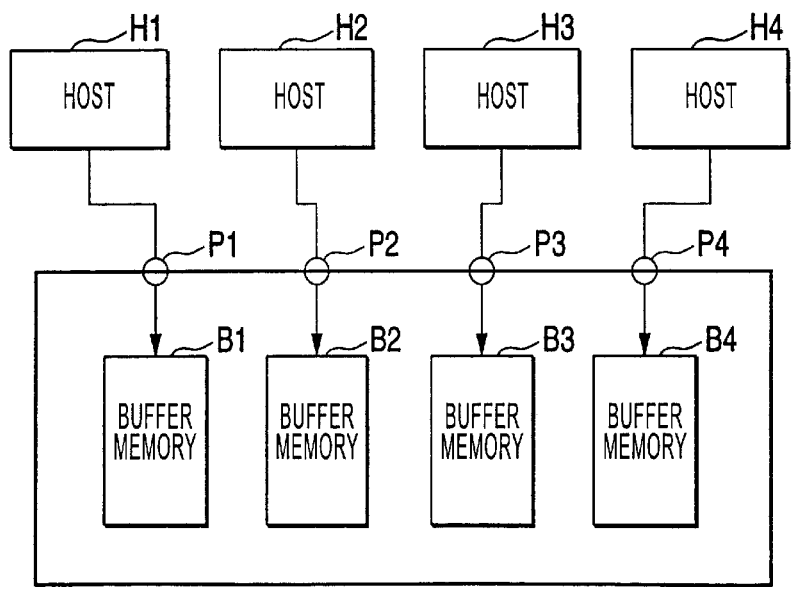
FIG. 27 is a schematic block diagram of a reception section of a conventional printer.

In the embodiments, the print request preparation means prepares print requests in the execution priority order determined by the priority determination means, whereby printing is executed in the execution priority order. However, the invention is not limited to the manner. For example, the invention can also be embodied if the priority is determined and the print mechanism is acquired when the print mechanism acquisition process is executed although print requests are prepared in a predetermined procedure. That is, as shown in FIG. 26, if the print mechanism is not busy at step S801, for example, whether or not m smaller than the m corresponding to the job number of the task exists in the table as shown in FIG. 16(B) is determined at step S810. Only when smaller m does not exist at step S810, a message of "print mechanism can be acquired" is returned to the print request preparation task p at step S803, whereby printing is executed based on the execution priorities.

The embodiments assume that the printer is a page printer. However, they can also be applied to printers such as ink jet printers, thermal printers, and dot impact printers.

As seen from the description made so far, according to the invention, image formation processing and printing based on a number of print jobs can be executed in the optimum order in response to the print data size and the memory capacity or the processing capability of the printer.

What is claimed is:

1. A printer comprising:
   reception means for receiving print data corresponding to a plurality of print jobs;
   means for generating intermediate code from the print data received by said reception means;
   print request preparation means for issuing print requests for the generated intermediate code;
   a print mechanism for printing based on a corresponding intermediate code in an acceptance order of the print requests issued by said print request preparation means; and
   priority determination means for determining a print job execution priority used as a trigger for issuing the print requests, whereby said priority determination means assigns execution priorities to the print jobs based upon a storage completion time of the print data in said reception means so that the print requests are issued according to the execution priorities.

2. The printer according to claim 1, wherein said reception means for receiving the print data has a plurality of input interfaces so as to receive the print jobs through the plurality of input interfaces in parallel.

3. The printer according to claim 1, wherein said reception means for receiving the print data has a network interface so as to receive the print jobs through the network interface in parallel.

4. The printer according to claim 1, wherein said means for generating intermediate code generates the generated intermediate code from the print data corresponding to each of the print jobs in parallel.

5. A printer comprising:
   means for receiving print data corresponding to a plurality of print jobs;
   means for storing a plurality of print data received by said means for receiving;
   means for generating intermediate code from each of the print data;
   means for storing intermediate code generated for each print data;
   print request preparation means for issuing print requests for the generated intermediate code;
   a print mechanism for printing based on the corresponding intermediate code in an acceptance order of the print requests issued by said print request preparation means; and
   priority determination means for determining a print job execution priority used as a trigger for issuing the print request;
   wherein said priority determination means can select either of first and second priority modes, the first priority mode assigning execution priorities to print jobs based upon a storage completion time of the print data in said means for storing a plurality of print data so that the print requests are issued according to the execution priorities, and the second priority mode assigning execution priorities to print jobs based upon a storage completion time of the intermediate code in said means for storing intermediate code so that the print requests are issued according to the execution priorities.

6. The printer according to claim 5, wherein said priority determination means further selects from a third priority mode for assigning the execution priorities to print jobs based upon a reception time of the print data stored in said means for storing a plurality of print data so that the print requests are issued according to the execution priorities and said priority determination means can select any one of said first to third priority modes.

7. The printer according to claim 6, wherein said priority determination means further selects from a fourth priority mode for assigning the execution priorities to print jobs based upon a storage stage time of intermediate code in said means for storing intermediate code so that the print requests are issued according to the execution priorities and said priority determination means can select any one of said first to fourth priority modes.

8. The printer according to claim 6, further comprising capacity determination means for determining whether or not an available storage capacity of at least one of said means for storing a plurality of print data and said means for storing intermediate code exceeds a predetermined value, and said priority determination means selecting one of the first, second and third priority modes in response to a determination result of said capacity determination means.

9. The printer according to claim 7, further comprising capacity determination means for determining whether or not an available storage capacity of at least one of said means for storing a plurality of print data and said means for storing intermediate code exceeds a predetermined value, wherein said priority determination means selects one of the priority modes in response to a determination result of said capacity determination means.

10. The printer according to claim 5, wherein said means for receiving print data has a plurality of input interfaces so as to receive the print jobs through the corresponding input interfaces in parallel.

11. The printer according to claim 5, wherein said means for receiving the print data has a network interface so as to receive the print jobs through the network interface in parallel.

12. The printer according to claim 5, wherein said means for generation intermediate code generated intermediate code from the print data corresponding to each of the print jobs in parallel.

13. A printer comprising:
    reception means for receiving print data corresponding to a plurality of print jobs;
    means for generating intermediate code from the print data received by said reception means;
    print request preparation means for issuing print requests for the generated intermediate code;
    a print mechanism for printing based on a corresponding intermediate code in an acceptance order of the print requests issued by said print request preparation means; and
    priority determination means for determining a print job execution priority used as a trigger for issuing the print requests, whereby said priority determination means assigns execution priorities to print jobs based upon a storage completion time of the intermediate code in said means for generating intermediate code so that the print requests are issued according to the execution priorities.

14. The printer according to claim 13, wherein said reception means has a plurality of input interfaces so as to receive the print jobs through the plurality of input interfaces in parallel.

15. The printer according to claim 13, wherein said reception means has a network interface so as to receive the print jobs through the network interface in parallel.

16. The printer according to claim 13, wherein said means for generating intermediate code generates intermediate code from the print data corresponding to each of the print jobs in parallel.

17. A printer comprising:

reception means for receiving print data corresponding to a plurality of print jobs;

means for generating intermediate code from the print data received by said reception means;

print request preparation means for issuing print requests for the generated intermediate code;

a print mechanism for printing based on a corresponding intermediate code in an acceptance order of the print requests issued by said print request preparation means; and priority determination means for determining a print job execution priority used as a trigger for issuing the print requests, whereby said priority determination means assigns execution priorities to print jobs based upon a storage start time of the intermediate code in said means for generating intermediate code so that the print requests are issued according to the execution priorities.

18. The printer according to claim 17, wherein said reception means has a plurality of input interfaces so as to receive the print jobs through the plurality of input interfaces in parallel.

19. The printer according to claim 17, wherein said reception means has a network interface so as to receive the print jobs through the network interface in parallel.

20. The printer according to claim 17, wherein said means for generating intermediate code generates intermediate code from the print data corresponding to each of the print jobs in parallel.

* * * * *